United States Patent
Aoki

(10) Patent No.: US 9,904,863 B2
(45) Date of Patent: Feb. 27, 2018

(54) INFORMATION PROCESSING APPARATUS AND CONTROL METHOD, PROGRAM RECORDING MEDIUM THEREOF

(71) Applicant: CANON KABUSHIKI KAISHA, Tokyo (JP)

(72) Inventor: Hitoshi Aoki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 288 days.

(21) Appl. No.: 14/680,753

(22) Filed: Apr. 7, 2015

(65) Prior Publication Data

US 2015/0294172 A1    Oct. 15, 2015

(30) Foreign Application Priority Data

Apr. 10, 2014  (JP) ................................. 2014-080732
Feb. 25, 2015  (JP) ................................. 2015-035786

(51) Int. Cl.
*G06K 9/00* (2006.01)
*G07C 9/00* (2006.01)
*G06F 21/32* (2013.01)

(52) U.S. Cl.
CPC ......... *G06K 9/00892* (2013.01); *G06F 21/32* (2013.01); *G07C 9/00087* (2013.01); *G06F 2221/2139* (2013.01); *G07C 2009/00095* (2013.01)

(58) Field of Classification Search
CPC ................ G06K 9/00892; G06F 21/32; G06F 2221/2139; G07C 9/00087; G07C 2009/00095
See application file for complete search history.

(56) References Cited

U.S. PATENT DOCUMENTS 8,743,051 B1 *  6/2014  Moy ..................... G09G 5/00
                                                    345/156
2004/0260669 A1 * 12/2004  Fernandez ........ G06F 17/30017
(Continued)

FOREIGN PATENT DOCUMENTS

CN    102938031 A    2/2013
CN    103714285 A    4/2014
(Continued)

OTHER PUBLICATIONS

Office Action dated Aug. 14, 2017, in counterpart CN Application No. 201510160819.9 (17 pages including English translation).

*Primary Examiner* — Jay Patel
*Assistant Examiner* — Joseph Suh
(74) *Attorney, Agent, or Firm* — Fitzpatrick, Cella, Harper & Scinto

(57) ABSTRACT

An information processing apparatus comprising an obtaining unit configured to obtain biological information of a person and a determination unit configured to determine, based on a state of the biological information of a plurality of persons including a specific person, processing allowed for a person who is not the specific person. The processing is performed by the information processing apparatus. The determination unit is configured to determine processing which is allowed for the person other than the specific person in relation to positional relation between the specific person and the information processing apparatus.

11 Claims, 17 Drawing Sheets

(56) References Cited

U.S. PATENT DOCUMENTS

| | | | | |
|---|---|---|---|---|
| 2009/0065578 A1* | 3/2009 | Peterson | G05B 19/048 | 235/382 |
| 2010/0159998 A1* | 6/2010 | Luke | H04M 1/6041 | 455/567 |
| 2012/0254736 A1* | 10/2012 | Levien | H04W 4/18 | 715/249 |
| 2013/0187617 A1* | 7/2013 | Tham | G08B 13/00 | 320/137 |
| 2013/0187890 A1* | 7/2013 | Paeg | G06F 3/0325 | 345/175 |
| 2013/0234992 A1* | 9/2013 | Hodges | G06F 3/041 | 345/175 |
| 2013/0303105 A1* | 11/2013 | Jo | H04N 7/183 | 455/404.1 |
| 2014/0203073 A1* | 7/2014 | Braun | G06K 7/10 | 235/375 |
| 2014/0210746 A1* | 7/2014 | Kim, II | G06F 3/0481 | 345/173 |
| 2014/0211950 A1* | 7/2014 | Neufeld | H04R 5/04 | 381/23 |
| 2014/0337634 A1* | 11/2014 | Starner | H04L 9/3231 | 713/186 |
| 2015/0163865 A1* | 6/2015 | Lee | H05B 6/687 | 426/231 |
| 2015/0198712 A1* | 7/2015 | Soderi | G01S 13/84 | 342/47 |
| 2015/0206366 A1* | 7/2015 | DiVincent | G07C 9/00158 | 340/5.52 |

FOREIGN PATENT DOCUMENTS

| | | |
|---|---|---|
| JP | 2009-156948 A | 7/2009 |
| JP | 2009-223651 A | 10/2009 |
| JP | 2011-049876 A | 3/2011 |
| JP | 2011-180865 A | 9/2011 |

* cited by examiner

| IN-CAMERA IMAGE | OUT-CAMERA IMAGE | MONITORING STATE OF OWNER | OPERATION RESTRICTION |
| --- | --- | --- | --- |
| OWNER'S FACE LARGEST | — | OWNER IS OPERATING | NONE |
| FACE LARGER THAN OWNER'S EXISTS | — | OWNER CAN SEE DISPLAY | ONLY APPLICATION BEING EXECUTED IS ALLOWABLE OPERATION |
| OWNER IS NOT PHOTOGRAPHED | OWNER IS PHOTOGRAPHED | OWNER IS NEAR BUT NOT ABLE TO SEE DISPLAY | ONLY ALLOW SCREEN SCROLLING |
| OWNER IS NOT PHOTOGRAPHED | OWNER IS NOT PHOTOGRAPHED | OWNER IS NOT HERE | DISAPPROVE OPERATION |

FIG. 6

| IN-CAMERA IMAGE | OUT-CAMERA IMAGE | DETECTION RESULT OF FINGERPRINT SENSOR | MONITORING STATE OF OWNER | OPERATION CONTROL |
|---|---|---|---|---|
| — | — | FINGERPRINT OF OWNER | OWNER IS OPERATING | NONE |
| OWNER IS PHOTOGRAPHED | — | FINGERPRINT OTHER THAN OWNER | OWNER CAN SEE DISPLAY | ONLY APPLICATION BEING EXECUTED IS ALLOWABLE OPERATION |
| OWNER IS NOT PHOTOGRAPHED | OWNER IS PHOTOGRAPHED | FINGERPRINT OTHER THAN OWNER | OWNER IS NEAR BUT NOT ABLE TO SEE DISPLAY | ONLY ALLOW SCREEN SCROLLING |
| OWNER IS NOT PHOTOGRAPHED | OWNER IS NOT PHOTOGRAPHED | FINGERPRINT OTHER THAN OWNER | OWNER DOES NOT EXIST | DISAPPROVE OPERATION |

FIG. 10

| FINGERPRINT SENSOR | ELAPSED TIME AFTER TEMPORARY REGISTRATION | MONITORING STATE OF OWNER | OPERATION LIMIT OF TERMINAL |
|---|---|---|---|
| FINGERPRINT OF OWNER | — | OWNER OPERATES | NONE |
| FINGERPRINT OF TEMPORARY REGISTRANT | LESS THAN PREDETERMINED TIME | LIKELY THAT OWNER IS NEAR | ONLY ALLOW SCREEN SCROLLING |
| FINGERPRINT OF TEMPORARY REGISTRANT | MORE THAN PREDETERMINED TIME | UNLIKELY THAT OWNER IS NEAR | DISAPPROVE OPERATION |
| FINGERPRINT OF NON-TEMPORARY REGISTRANT | — | OWNER DOES NOT EXIST | DISAPPROVE OPERATION |

FIG. 16

INFORMATION PROCESSING APPARATUS AND CONTROL METHOD, PROGRAM RECORDING MEDIUM THEREOF

BACKGROUND OF THE INVENTION

Field of the Invention

The present disclosure relates to a security technology of an information processing apparatus.

Description of the Related Art

Recently, the information terminal such as the smart phone, the tablet and the like comprises a biometric authentication function such as a face authentication, a fingerprint authentication and the like to prevent an unauthorized operation by a person other than an owner. In such information terminal, it is necessary to register biological information such as face image information, fingerprint information and the like of the owner in advance.

Japanese Patent Application Laid-open No. 2009-156948 discloses a display control apparatus. In the apparatus, when an image which does not match with a previously registered face image exists in the images currently photographed by a camera, the operation of the information terminal is invalidated for preventing peeping.

Further, Japanese Patent Application Laid-open No. 2009-223651 discloses a face authentication apparatus, in which, to prevent "impersonating" operation by others, a self-portrait is photographed at a predetermined time interval while the information terminal is being operated, and only when a face which matches with a face image registered in advance, a permission to use a function to be secured is given.

Further, Japanese Patent Application Laid-open No. 2011-049876 discloses a mobile terminal comprising a touch panel capable of reading a fingerprint by a touch sensor, in which verification is performed by reading the fingerprint by a finger's touch and the application being executed is terminated when the fingerprint verification does not match.

SUMMARY OF THE INVENTION

The information processing apparatus of the present disclosure includes: an obtaining unit configured to obtain biological information of a person; and a determination unit configured to determine, based on a state of the biological information of a plurality of persons including a specific person, processing which is allowed for a person other than the specific person, the processing is performed by the information processing apparatus, wherein the determination unit is further configured to determine processing which is allowed for the person other than the specific person in relation to a plurality of positional relation between the specific person and the information processing apparatus.

Further features of the present invention will become apparent from the following description of exemplary embodiments (with reference to the attached drawings).

BRIEF DESCRIPTION OF THE DRAWINGS

FIG. 6 is a table illustrating an example of the operation restriction level of the information processing apparatus which is set according to a determination result of the monitoring state of the owner.

FIG. 10 is a table illustrating an example of the operation restriction level of the information processing apparatus which is set in accordance with a determination result of the monitoring state of the owner.

FIG. 16 is a table illustrating an example of the operation restriction level of the information processing apparatus which is set in accordance with a determination result of the monitoring state of the owner.

DESCRIPTION OF THE EMBODIMENTS

To show Webpage, picture, moving image and the like displayed on a display screen of the information terminal to a person other than the owner, there is a case where the owner temporarily passes the information terminal to the other person. In this case, in a conventional information terminal, when no operation is performed for a fixed time, it turns to a lock state and any operation is no longer accepted. It is sometimes inconvenient to return the information terminal to the owner asking to release the lock state every time the information terminal turns to the locked state.

Further, in the conventional art, when none of the faces in the photographed image which is currently photographed by a camera of the information terminal matches with the previously registered faces, or when a face of another person is found in the photographed image, the operation of the information terminal is inhibited. This is inconvenient. Similarly, it is sometimes inconvenient to inhibit the operation when a fingerprint of a person other than the owner is detected. Further, resetting access restriction of the application every time the owner rends the information terminal considering a situation, it is sometimes inconvenient because the owner may mistakenly set or may forget to return to the original settings.

The main object of the present disclosure is to provide an information processing apparatus which can restrict an operation performed by a person other than the owner without requiring any setting in advance to restrict the operation to the information processing apparatus.

In the following, embodiments are described with reference to the accompanying drawings. Note that, in the present embodiment, description is given exemplifying a case where the present disclosure is applied to, for example, the information processing apparatus, which is the information terminal such as the smart phone, the tablet and the like.

Figure 1A:
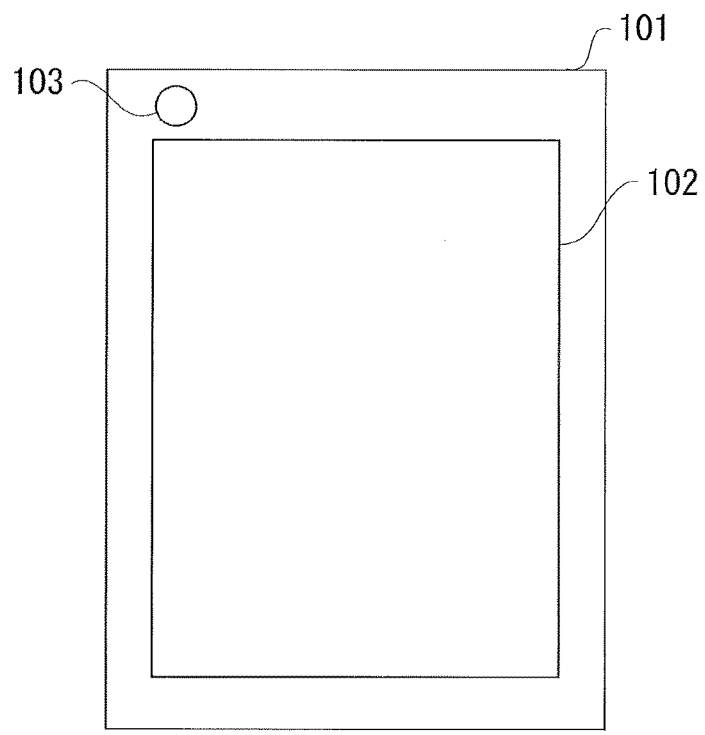
FIGS. 1A and 1B are diagrams illustrating examples of the appearance of an image processing apparatus according to a first embodiment.
Figure 1B:
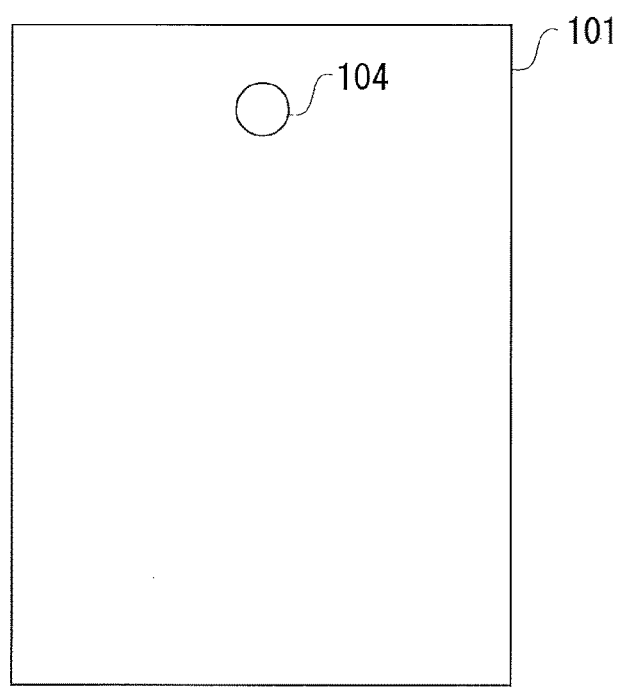

FIG. 1 is a diagram illustrating an example of the appearance of an image processing apparatus according to a first embodiment. FIG. 1A is a front view of the information processing apparatus and FIG. 1B is a back view of the information processing apparatus. Note that in the present embodiment, description will be given in a case where face image information about a subject person is handled as biological information and the biological information is obtained using an imaging apparatus (for example, camera) included in the information processing apparatus.

The information processing apparatus 101 shown in FIG. 1 includes a touch panel display 102, an in-camera 103, and an out-camera 104. The in-camera 103 images a direction which is the same as that of the touch panel display 102. The out-camera 104 images a direction which is opposite to the direction of the in-camera 103.

The touch panel display 102 includes a display screen on which various information is displayed. The touch panel display 102 also includes a sensor to detect an input by an operator, including, for example, a touch input. In the following description, the touch panel display 102 is simply referred to as a touch panel 102.

The in-camera 103 is provided on a front side of the information processing apparatus 101 at a predetermined position. The in-camera 103 is, for example, capable of imaging the operator who is operating to the touch panel display 102. Also, the out-camera 104 is provided on a back side of the information processing apparatus 101 at a predetermined position.

Figure 2:
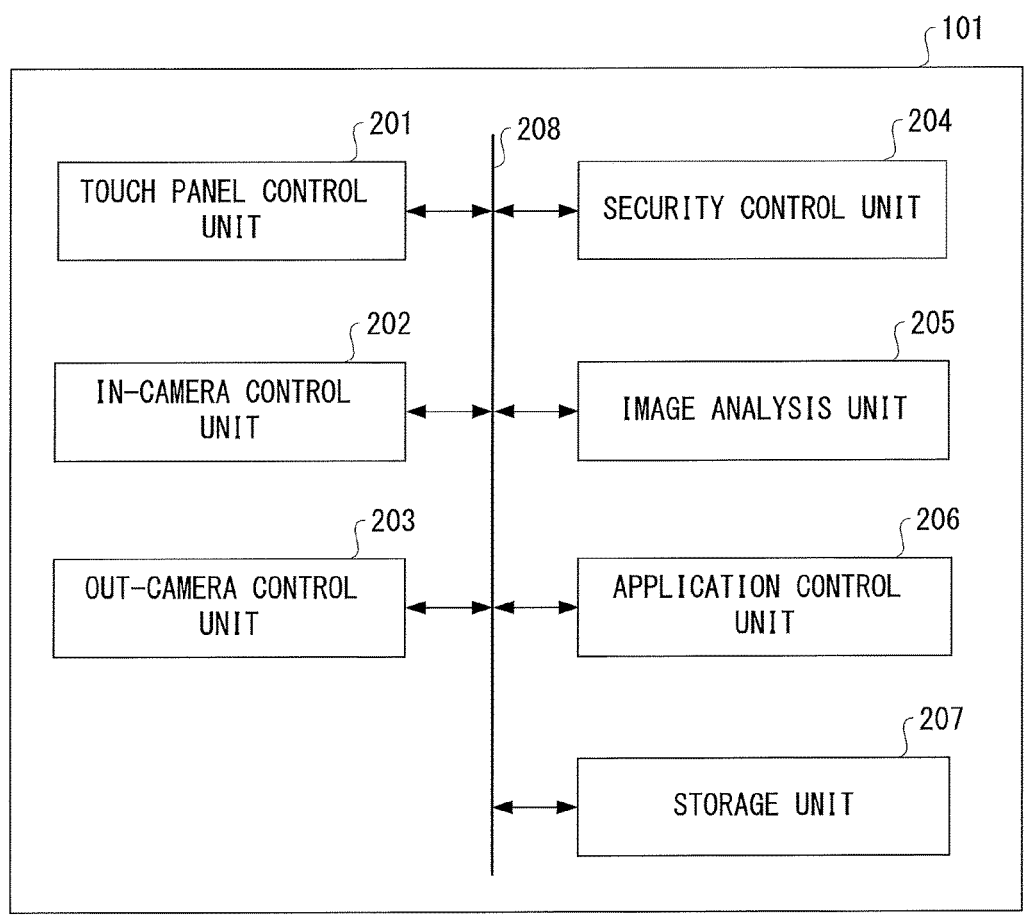
FIG. 2 is a block diagram illustrating an example of a functional configuration of the information processing apparatus.

FIG. 2 is a block diagram illustrating an example of a functional configuration of the image processing apparatus 101. The information processing apparatus 101 includes a touch panel control unit 201, an in-camera control unit 202, an out-camera control unit 203, a security control unit 204, an image analysis unit 205, an application control unit 206, and a storage unit 207.

Note that each functional unit is realized by a central processing unit (CPU) included as hardware in the information processing apparatus 101. In particular, each function unit is realized by the CPU by reading a predetermined program stored in a program memory and the like and executing processing in accordance with each flow chart as will be described later. Further, for example, when hardware is constituted as an alternative to at least a part of the software processing using the CPU as above, a computing unit or a circuit corresponding to processing of each functional unit described in this description may be constituted.

The touch panel control unit 201 controls the touch panel 102. In particular, the touch panel control unit 201 obtains information which is input from the touch panel 102, and transmits the operation information which indicates the operation performed by the operator of the application control unit 109. Based on an instruction from the application control unit 109, the touch panel control unit 201 also displays various information on the display screen of the touch panel 102. The touch panel 102 as controlled in this manner works as an input unit for receiving input information from a subject operator. Also, interpreting the input information in light of what is displayed on the display screen, the touch panel control unit 201 works as a receiving unit where accepts the operation performed by the operator.

The in-camera control unit 202 controls a start or an end of imaging by the in-camera 103. The out-camera control unit 203 controls a start or an end of imaging by the out-camera 104. Based on the imaging data imaged by the in-camera 103 and the out-camera 104, the in-camera control unit 202 and the out-camera control unit 203 work as an obtaining unit which obtains the biological information of one or a plurality of subjects. Note that the imaging data imaged by the in-camera 103 and the out-camera 104 is stored in the storage unit 207.

According to an analysis result of the image analysis unit 205 based on the imaged image of the in-camera and the out-camera 104, the security control unit 204 sets permission/non-permission of a response to the operation to the information processing apparatus 101, that is, the security control unit 204 sets a security level (operation restriction level). In this way, the security control unit 204 works as a control unit. In particular, the security control unit 204 identifies the operation which is allowed for the operator at that time according to the analysis result of the image analysis unit 205 and controls such that the information processing apparatus 101 responds only to the identified operation. In the present embodiment, a positional relation between the information processing apparatus 101 and its owner is estimated based on the biological information obtained using the in-camera 103 and the out-camera 104 and the processing which is allowed for the operator is determined according to the estimated positional relation. In particular, a permission level of processing given to an operator who is not the owner of the apparatus is controlled depending on an owner's monitorable level of the information processing apparatus 101 which exists in the estimated positional relation. In particular, when the apparatus is being operated by the person who is not the owner, if an operation which is interpreted by the touch panel control unit 201, working as the receiving unit, is the operation identified by the security control unit 204, the identified operation is notified to the application control unit 206. On the other hand, if an operation which is interpreted by the touch panel control unit 201 is not the allowed operation which is identified by the security control unit 204, no notification is sent to the application control unit 206. However, it is not limited to this. For example, depending on whether the operation notified from the touch panel control unit 201 is the identified operation or not, the application control unit 206 may be controlled for allowing or inhibiting response to the operation. Note that the processing procedure of the control will be described in the following description in detail with FIGS. 3 and 4.

The image analysis unit 205 analyzes the image imaged by the in-camera 103 or the out-camera 104. The analysis is to determine whether a predetermined condition is satisfied by, for example, extracting face image information from the imaged images of the in-camera 103 and the out-camera 104 and determining whether a person matching with the face image information registered in the storage unit 207 is found in the extracted images. In this way, the image analysis unit 205 works as the analysis unit. In the present embodiment, when the face of the owner of the apparatus is photographed on the in-camera 103, it is deemed that the owner is in the touch panel display side and is facing to the touch panel. Then, in this case, it is deemed that a user is in a position where he can monitor how the apparatus is being operated (that is, the content displayed on the display of the touch panel 102). On the other hand, when the face of the owner is photographed on the out-camera 104, it is deemed that the owner is not in the touch panel display side and is not facing to the touch panel. In this case, it is deemed that a user is in a position where he can recognize the apparatus itself, but cannot monitor how the apparatus is being operated. Further, in a case where the owner is photographed on neither of the cameras, it is deemed very likely that the owner does not exist in a position where he can monitor the apparatus. In the present embodiment, based on obtaining the biological information of persons including the owner and the operator using the two cameras, one of which installed in a direction different from the other, positional relation between the owner and the apparatus is estimated. Then, according to the estimated positional relation, a state of how the owner is monitoring the apparatus is identified and an operation restriction according to the state is set.

The application control unit 206 controls various applications executed in the information processing apparatus 101, including opening/closing Web browser, e-mail application, telephone application and the like.

The storage unit 207 stores various programs executed by the CPU and various data. For example, the storage unit 207 comprises various storage devices including a read only memory (ROM) (not shown), a random access memory (RAM) (not shown), and a hard disk drive (not shown). Further, face image information about the owner of the information processing apparatus 101 is registered in advance as the registered biological information. Description is given with regard to a processing procedure of the operation restriction by the information processing apparatus 101 with FIGS. 3 to 5.

Figure 3:
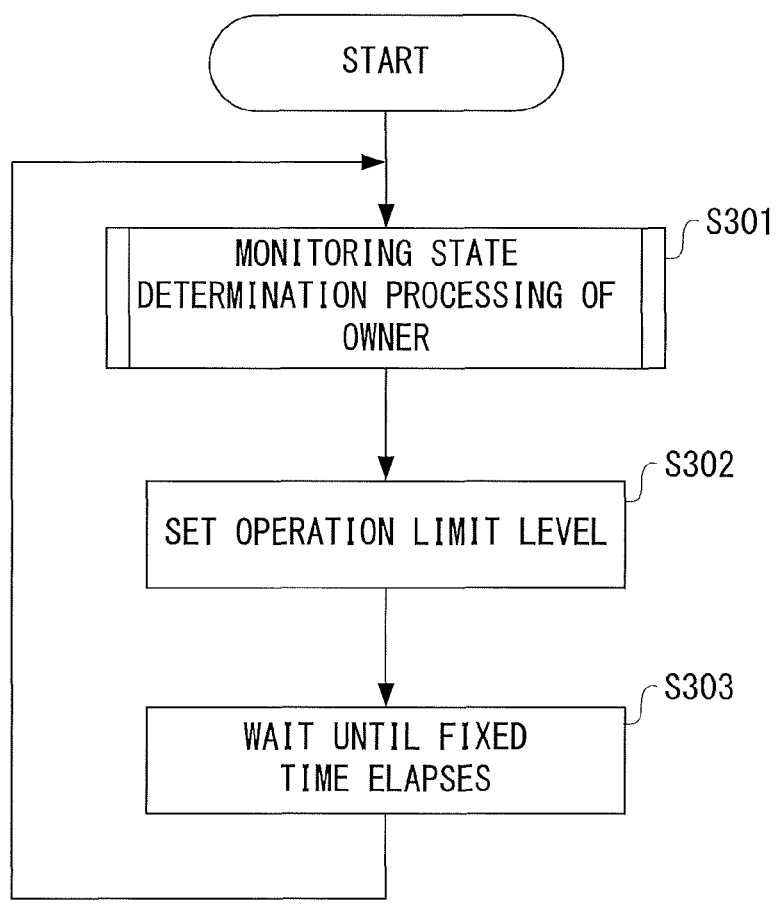
FIG. 3 is a flowchart illustrating an example of a processing procedure which sets an operation restriction level of the information processing apparatus.
Figure 4:
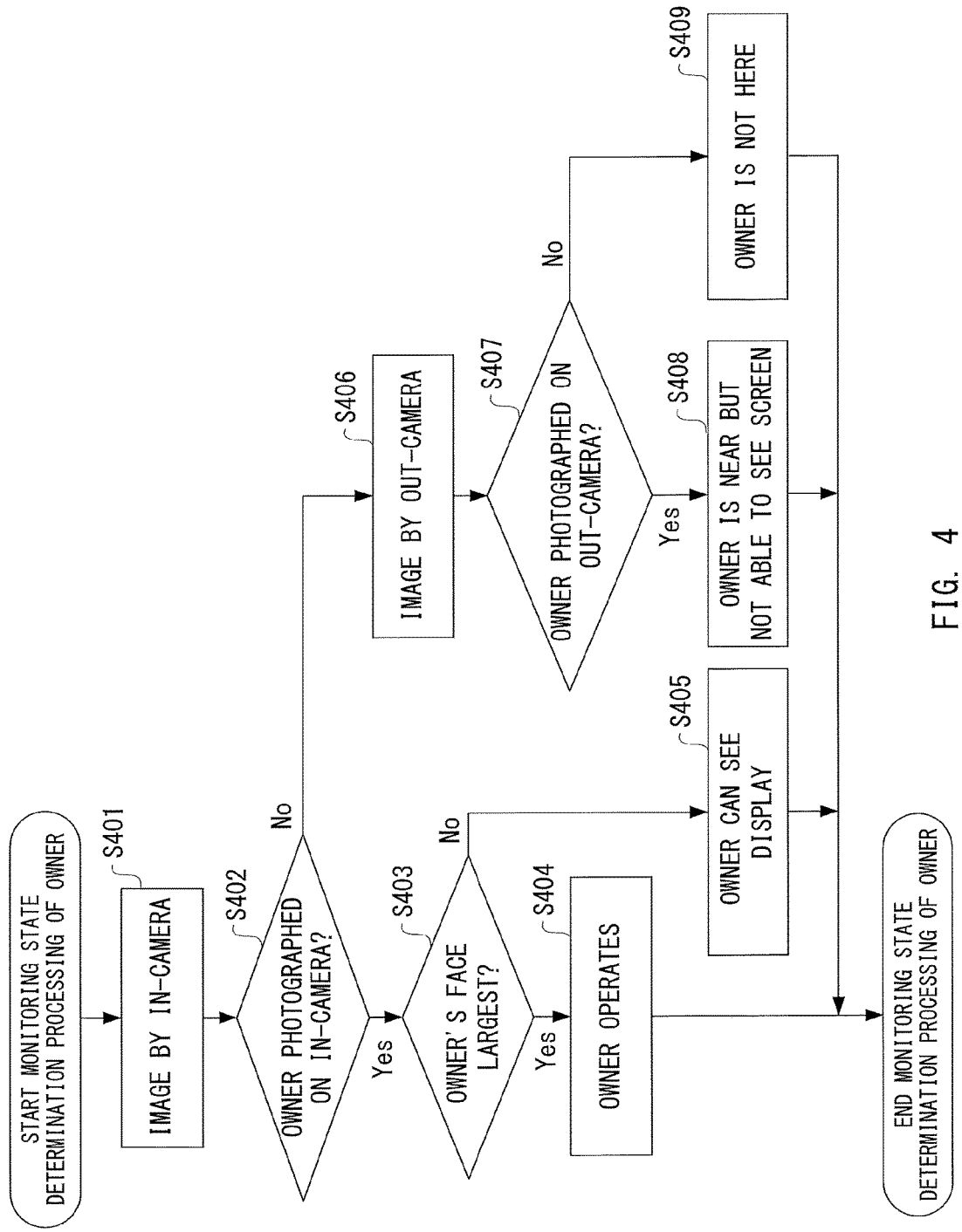
FIG. 4 is a flowchart illustrating a particular example of monitoring state determination processing of an owner.

FIG. 3 is a flowchart illustrating an example of a processing procedure which sets an operation restriction level of the information processing apparatus 101. FIG. 4 is a flowchart illustrating a particular example of monitoring state determination processing of the owner shown in FIG. 3. Note that each processing shown in FIGS. 3 and 4 is mainly executed by the security control unit 204.

FIG. 5 is an image diagram representing a situation where an operator operates the image processing apparatus 101. In a situation shown in FIG. 5A, a person 501, an owner of the information processing apparatus 101, is operating the information processing apparatus 101. Also, next to the person 501, a person 502 other than the owner of the information processing apparatus 101 is looking the touch panel 102 with the person 501. Also, FIG. 5A represents a situation where the both the person 501 and the person 502 are within an imaging range of the in-camera 103. Note that, as mentioned, the face image information of the person 501 as the owner is registered in the storage unit 207 as the registered biological information. On the other hand, when the face image information of the person 502 other than the owner of the information processing apparatus 101 is detected, the face image information is handled as non-registered biological information, which is not the registered biological information.

Figure 5A:
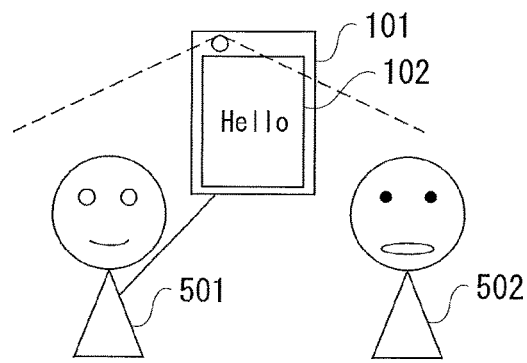
FIGS. 5A, 5B, 5C and 5D are image diagrams each illustrating a situation where an operator operates the image processing apparatus.
Figure 5B:
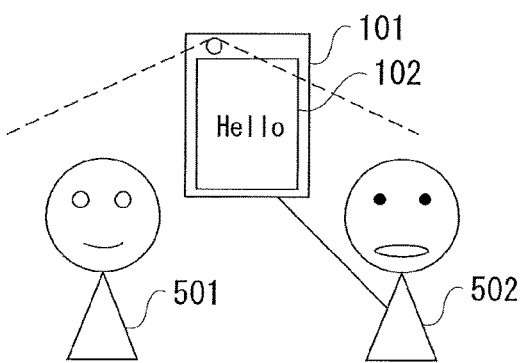

In a situation shown in FIG. 5B, the person 502 is operating the information processing apparatus 101. Also, next to the person 502, the person 501 is looking the touch panel 102 with the person 502. Also, FIG. 5B represents a situation where the person 501 and the person 502 are included within the imaging range of the in-camera 103.

Figure 5C:
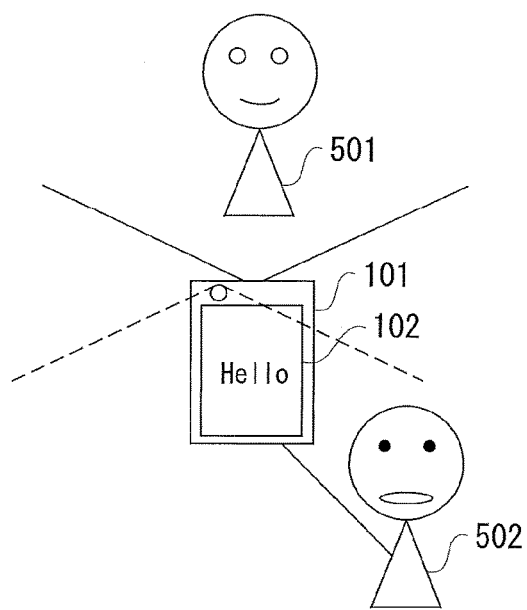

In a situation shown in FIG. 5C, the person 502 is operating the information processing apparatus 101. Also, FIG. 5C represents a situation where the person 501 is looking how the person 502 is operating the information processing apparatus 101 near the person 502. In particular, the person 501 is in a position where he cannot see the touch panel 102, and only the person 502 is within the imaging range of the in-camera 103. Further, the person 501 is within an imaging range of the out-camera 104.

Figure 5D:
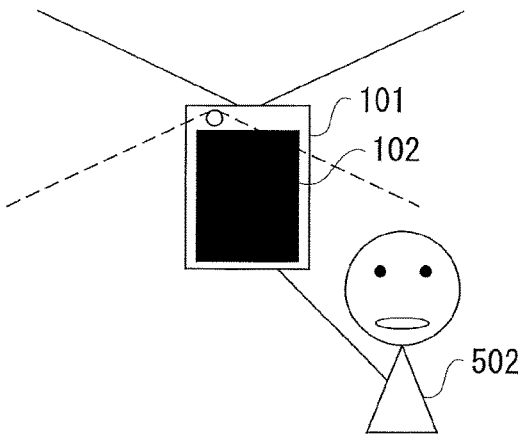

In a situation shown in FIG. 5D, the person 502 is operating the information processing apparatus 101 and the person 501, the owner of the information processing apparatus 101, is not present there. In this situation, only the person 502 is within the imaging range of the in-camera 103 and the person 501 is out of the imaging ranges of the in-camera 103 and the out-camera 104. Description is given, based on each of the situations as above, with regard to a processing procedure of the operation restriction by the information processing apparatus 101.

Back to the description of FIG. 3, the security control unit 204 determines the monitoring state of the owner (S301). In the following, the monitoring state determination processing of the owner will be particularly described with FIG. 4.

The security control unit 204 executes imaging by the in-camera 103 (S401). The security control unit 204 analyzes the imaged image of the in-camera 103 via the image analysis unit 205. In particular, the security control unit 204 analyzes whether a person matching with the face image information of the person 501 registered in the storage unit 207 is found or not found within the imaged image. Based on the analysis result, the security control unit 204 determines whether the person 501 is found in the imaged image of the in-camera 103 (S402) or not.

If it is determined that the person 501 is found in the imaged image of the in-camera 103 (S402: Yes), the security control unit 204 proceeds to a processing of Step S403. If it is determined that the person 501 is not found in the imaged image of the in-camera 103 (S402: No), the security control unit 204 proceeds to a processing of Step S406. That is, in the situations shown in FIGS. 5A and 5B, the processing proceeds to the processing of Step S403, since, in both situations, the person 501 is included in the imaging range of the in-camera 103. Also, in the situations shown in FIGS. 5C and 5D, the processing proceeds to the processing of Step S406, since, in both situations, the person 501 is not included within the imaging range of the in-camera 103.

First, description is given with regard to a processing procedure in a case where the person 501 is found in the imaging range of the in-camera 103, that is, in a case where the owner is photographed in the imaged image of the in-camera 103. In this embodiment, according to a state of the face image, it is determined which person is operating the information processing apparatus 101. Details will be described in the following description. The security control unit 204 analyzes, via the image analysis unit 205, whether the imaged face size of the person 501 is larger than any other persons in the imaged image of the in-camera (S403). This is the processing executed to determine who is the operator of the information processing apparatus 101, since it is estimated that the face of the person who is operating the information processing apparatus 101 is photographed with the largest size in the imaged images.

If it is determined that the imaged face size of the person 501 is larger than any other persons (S403: Yes), the security control unit 204 determines that the person 501, that is, the owner of the information processing apparatus 101 is operating the information processing apparatus 101 (S404). If not (S403: No), the security control unit 204 determines that the person 501, the owner of the information processing apparatus 101, is in a situation where he can see the display screen (S405). Although the person 501 is not operating the information processing apparatus 101, the person 501 is found in the imaged image of the in-camera 103. Therefore, it is estimated that the owner is in a situation where he can see the display screen.

For example, in a situation shown in FIG. 5A, the person 501 is operating the information processing apparatus 101. In this situation, the distance between the person 501 and the in-camera 103 is the closest so that the face of the person 501 is imaged with the largest size in the imaged images. As a result, it is analyzed in the processing of Step S403 that the owner's face size is the largest. Therefore, it is determined in the processing of Step 404 that the owner is operating the information processing apparatus 101. Also, in a situation shown in FIG. 5B, the person 502 is operating the information processing apparatus 101. In this situation, the distance between the person 502 and the in-camera is the closest so that the face of the person 502 is imaged with a size larger than that of the person 501 in the imaged images. Therefore, it is not analyzed in the processing of Step S403 that the face size of the person 501 as the owner is the largest. In this case, it is determined in the processing of Step S405 that the owner is not operating the information processing apparatus 101 but is in a situation where he can see the display screen.

Next, description is given with regard to a processing procedure in a case where the person 501 is not included within the imaged images of the in-camera 103, that is, in a case where the owner is not photographed in the imaged image of the in-camera 103. The security control unit 204 executes imaging by the out-camera (S406) and analyzes whether or not the person 501 as the owner is found in the imaged image of the out-camera 104 via the image analysis unit 205 (S407). This is the processing to determine whether the person 501 as the owner is near the information processing apparatus 101 or not. For example, if the owner is near the information processing apparatus 101, it is estimated that it is in a situation where the owner temporarily passes the information processing apparatus 101 to a reliable third person. On the other hand, if the owner does not present near the information processing apparatus 101, it is estimated that someone is about to operate the information processing apparatus 101 selfishly in an owner's unintended situation.

For example, in a situation shown in FIG. 5C, the person 501 as the owner is included within the imaged image of the out-camera 104. In this situation, since the person 501 is found in the imaged images of the out-camera 104 (S407: Yes), the security control unit 204 determines that it is in a situation where the owner is near the information processing apparatus 101 but is not able to see the display screen (S408). Further, in a situation shown in FIG. 5D, the person 501 as the owner is not found in the imaged image of the out-camera 104. In this situation, since the person 501 is not found in the imaged image of the out-camera 104 (S407: No), the security control unit 204 determines that it is in a situation where the owner is not near the information processing apparatus 101 (S409). This is how the security control unit 204 determines the monitoring state of the owner.

Back to the description of FIG. 3, after the monitoring state of the owner is determined in the processing of Step S301, the security control unit 204 sets the operation restriction level of the information processing apparatus 101 according to the determination result (S302). In the following, the operation restriction level which is set will be described in detail with FIG. 6.

FIG. 6 is a table illustrating an example of the operation restriction level of the information processing apparatus 101 which is set according to the monitoring state determination result of the owner. In the table shown in FIG. 6, each item, including in-camera image, out-camera image, monitoring the state of owner, and operation restriction, is defined, by respectively associating with situations.

For example, suppose it is determined in the processing of Step S404 that the owner is operating the information processing apparatus. In this case, the security control unit 204 does not restrict any operation of the information processing apparatus 101 in the processing of Step S302. It means that the operation restriction level is set to a mode where all functions and applications of the information processing apparatus 101 are made available.

Also, suppose it is determined in the processing of Step S405 that the owner can see the display screen. In this case, the security control unit 204 sets the operation restriction level of the information processing apparatus 101 in the processing of Step S302 to a mode where only operates the application being executed. For example, if the application being executed in the information processing apparatus 101 is a Web browser, switching the Web browser to another application is restricted. For example, switching from the Web browser to the e-mail application or to the telephone application is restricted. This is because the owner himself is not operating the information processing apparatus 101. However, the other person is operating the information processing apparatus under a situation where the owner can see the display screen of the information processing apparatus 101. Therefore, this setting of the operation control level is intended not to largely restrict the operation to the information processing apparatus 101. It is also assumed that the other person operating the information processing apparatus 101 may accidentally switch the application. Therefore, switching the application is restricted to prevent the other person from seeing the owner's unintended information.

Further, suppose it is determined in the processing of Step S406 that the owner is near the display screen but he cannot see it. In this case, the security control unit 204 sets the operation restriction level of the information processing apparatus 101 in the processing of Step S302 to a mode where only allows a screen scroll operation. For example, in a case where the Web browser is being executed in the information processing apparatus 101, simply scrolling the Web page currently being displayed is allowed. However, page transition such as clicking a link on the Web page to transit to the other Web page is restricted.

Also, switching from the Web browser to the other application, such as to the e-mail application or the telephone application is restricted. This represents a situation where, for example, the owner is temporarily passing the information processing apparatus to the other person to show the other person the Web page being displayed on the Web browser but the owner cannot monitor how the other person is operating the information processing apparatus. Therefore, the other person is allowed to see the Web page displayed on the display screen when the owner passes the information processing apparatus 101 to the other person. However, the other person cannot display other Web page on the display screen or cannot make any post from the Web page unless permitted.

Note that, it is not restricted to browsing the Web page, but may be, for example, browsing a particular e-mail or sending an image from a certain image group. The scroll operation is an operation to optionally select and instruct portion of contents to be displayed on the display screen in a situation where a part of one content is displayed on the display screen. That is, this is an operation to display an optional area part by part even in a case where browsing the entire contents is allowed. Such a situation, i.e., the entire contents cannot be browsed at a time, may occur due to the restriction in the size of the display area and the like. It means that, in the present embodiment, in a case where the owner is near the display screen, but is not able to see it, by restricting the operation of the scroll operation, instruction to display contents allowed browsing is allowed and instruction to display other contents not allowed browsing is not allowed. Alternatively, in the contents allowed browsing, if the operation is to optionally control the display of the content, in addition to the scroll operation, the operation may be allowed. For example, changing display magnification is also allowed.

Further, suppose it is determined in the processing of step S407 that the owner is not near. In this case, the security control unit 204 disapproves all operations to the information processing apparatus 101 in the processing of Step 303. That is, the security control unit 204 sets the operation restriction level to a mode where all functions and applications of the information processing apparatus 11 are unavailable. Disapproving operation means, for example, to turn off (OFF) the display on the display screen of the touch panel 102 so that nothing is displayed on the display screen. This is how to make a situation where inhibits the person 502 from operating the information processing apparatus 101. This prevents a malicious third person from operating the information processing apparatus 101 and thus seeing information in the absence of the owner without permission of the owner.

Back to the description of FIG. 3, after setting the operation restriction level in the processing of Step S302, the security control unit 204 waits until a fixed time elapses (S303). Then, after a fixed time elapses, the security control unit 204 returns to the processing of Step S301. Note that, a timer may be used to determine whether a fixed time is elapsed or not (not shown). As mentioned, the monitoring state of the owner is periodically determined by the security control unit 204. Then, according to the situation of the time, the operation restriction level is changed. Also, the security control unit 204 controls so as not to start next processing a fixed time elapses. This processing prevents a situation where the operation of the information processing apparatus 101 is inhibited only because not any person is imaged by the in-camera 103 and the out-camera 104 for a short while.

As mentioned, according to the monitoring state of the owner, the information processing apparatus according to the present embodiment controls to identify an operation which is allowed for the non-owner and to allow response of the information processing apparatus to the operation. Thereby, certain operation authority is temporarily given to the non-owner. That is, operation allowed for the non-owner can be restricted without performing any settings in advance to restrict the operation of the information processing apparatus.

Next, in a second embodiment, description will be given in a case where fingerprint information about a subject person is handled as biological information and the biological information of the operator is obtained using a fingerprint detection device (for example, fingerprint sensor) included in the information processing apparatus. Note that the same symbols are used for the functional components which are identical to those as already described in the first embodiment and the description thereof will be omitted. Note that, also in the second embodiment, each functional unit is realized by the CPU included in the information processing apparatus 101 as hardware. In particular, each function unit is realized by the CPU by reading a predetermined program stored in a program memory and the like and executing processing in accordance with each flow chart as will be described later. Further, when hardware is constituted as an alternative to at least a part of the software processing using the CPU, a computing unit or a circuit corresponding to processing of each functional unit described in this description may be constituted. In the second embodiment, in a case where the operator identified based on the fingerprint information is not the owner, the positional relation between the owner and the apparatus is estimated based on a face detection from the imaged images of the two cameras. Then, operation restriction according to the estimated positional relation is set. The processing to set the operation restriction according to the positional relation between the owner and the apparatus is common with the first embodiment.

Figure 7A:
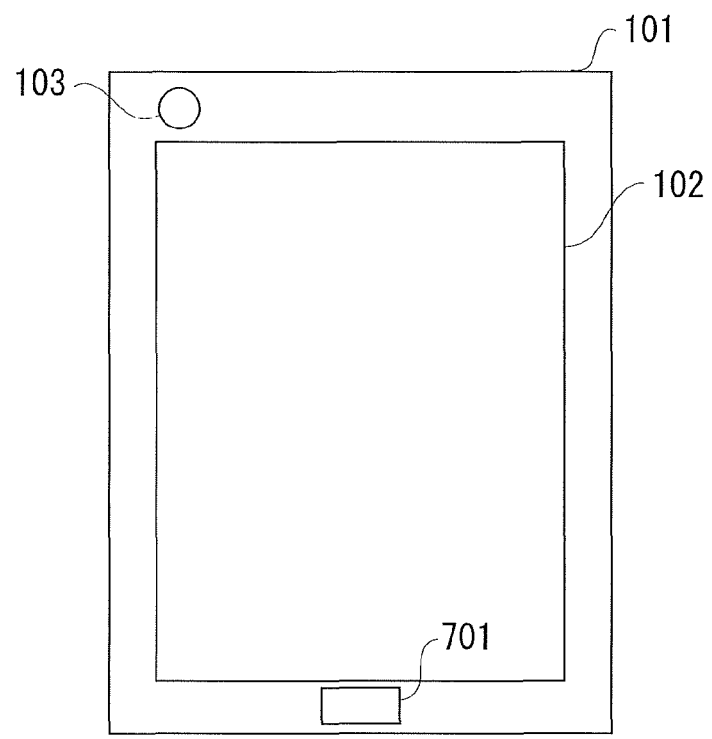
FIGS. 7A and 7B are diagrams illustrating examples of the appearance of an image processing apparatus according to a second embodiment.
Figure 7B:
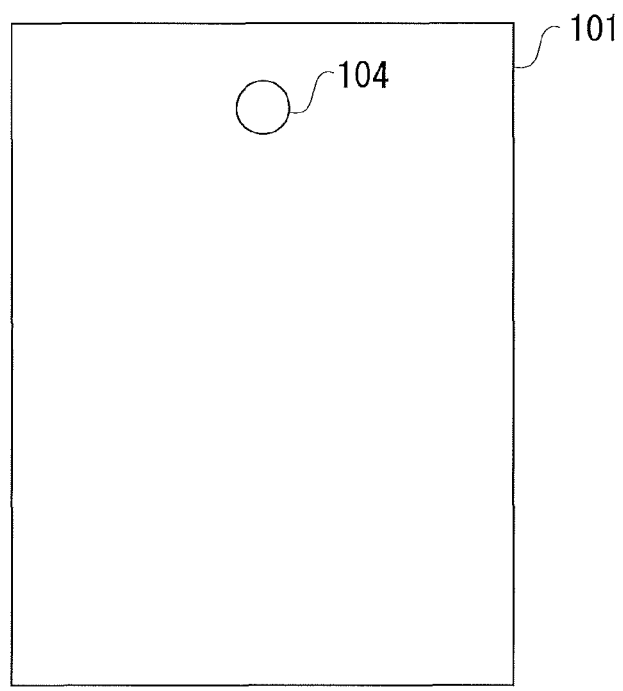

FIG. 7 is a diagram illustrating an example of the appearance of an image processing apparatus according to the present embodiment. FIG. 7A is a front view of the information processing apparatus and FIG. 7B is a back view of the information processing apparatus. This information processing apparatus 101 is different from that shown in FIG. 1 in that a fingerprint sensor 701 is provided on its front (touch panel display 102 side). The fingerprint sensor 701 obtains fingerprint information of a finger touched a fingerprint detection area of its surface. In addition to obtaining the fingerprint information, the fingerprint sensor 701 may work, for example, as an operation button of the information processing apparatus 101.

Figure 8:
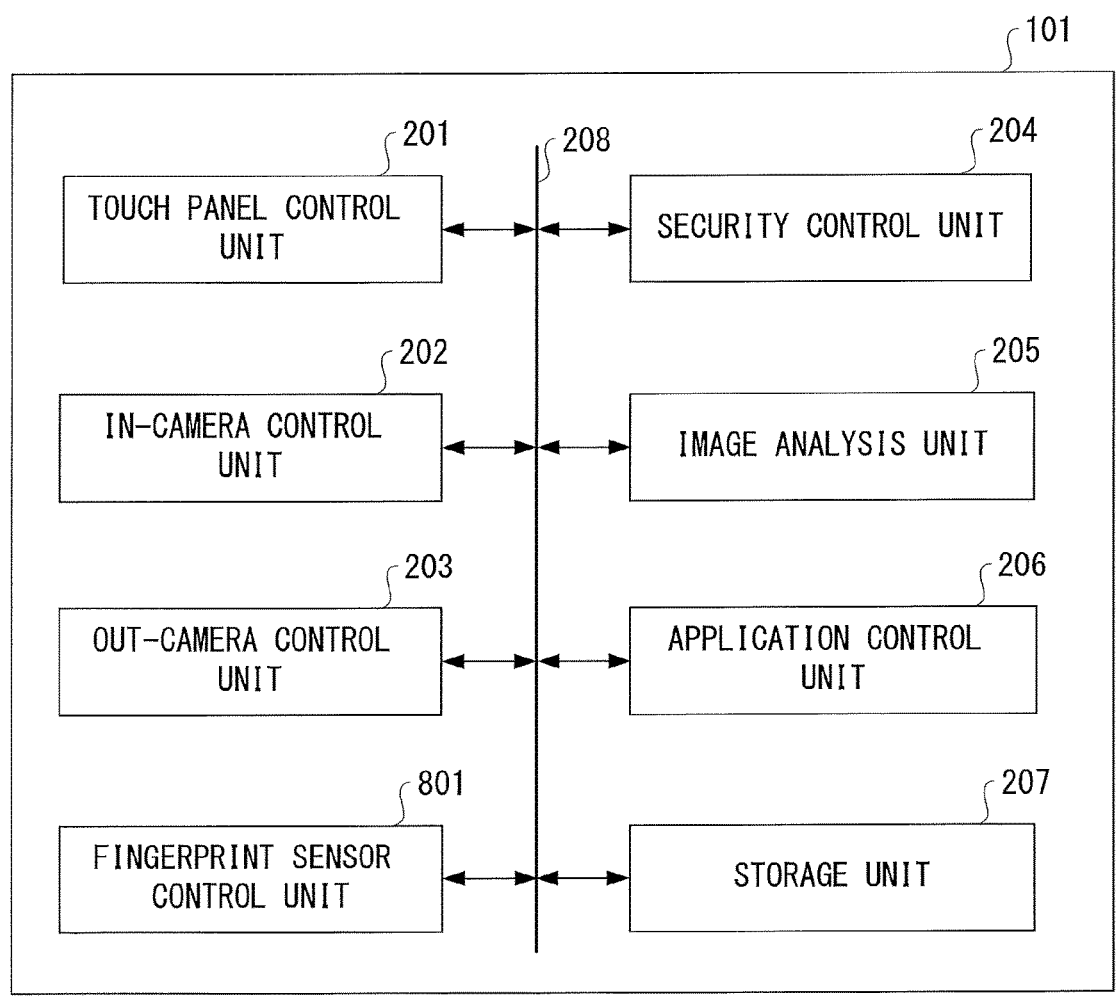
FIG. 8 is a block diagram illustrating an example of a functional configuration of the image processing apparatus.

FIG. 8 is a block diagram illustrating an example of functional configuration of the image processing apparatus 101 according to the present embodiment. This information processing apparatus 101 according to the present embodiment is different from the information processing apparatus 101 according to the first embodiment in that a fingerprint sensor control unit 801 is included therein. Further, the fingerprint information of the person 501 as the owner is registered in advance in the storage unit 207 as the registered biological information.

The fingerprint sensor control unit 801 controls the fingerprint sensor 701. In particular, when a finger touched a fingerprint detection area of the fingerprint sensor 701, the fingerprint sensor control unit 801 controls to obtain fingerprint information of the finger. The fingerprint sensor control unit 801 also analyzes the obtained fingerprint. In the fingerprint analysis, it is determined whether a predetermined condition is satisfied by, for example, comparing the fingerprint information obtained through the fingerprint sensor 701 with the fingerprint information of the owner which is registered in advance in the storage unit 207. Further, it is determined whether a person who touched the fingerprint sensor 701 is the owner or not. In this way, the fingerprint sensor control unit 801 works as an analysis unit. Note that the fingerprint information about the owner registered in the storage unit 207 is the fingerprint information of a particular finger such as a right index finger, or the fingerprint information of all fingers of the owner. However, when touching the fingerprint sensor 701 by a finger other than the registered finger, the fingerprint sensor control unit 801 may determine that the person touching the fingerprint sensor 701 is not the owner. Therefore, it is preferable to previously register the fingerprint information of all fingers which is likely to use when operating the information processing apparatus. Description is given with regard to a processing procedure of the monitoring state determination of the owner by the information processing apparatus 101 according to the present embodiment with FIG. 9.

Figure 9:
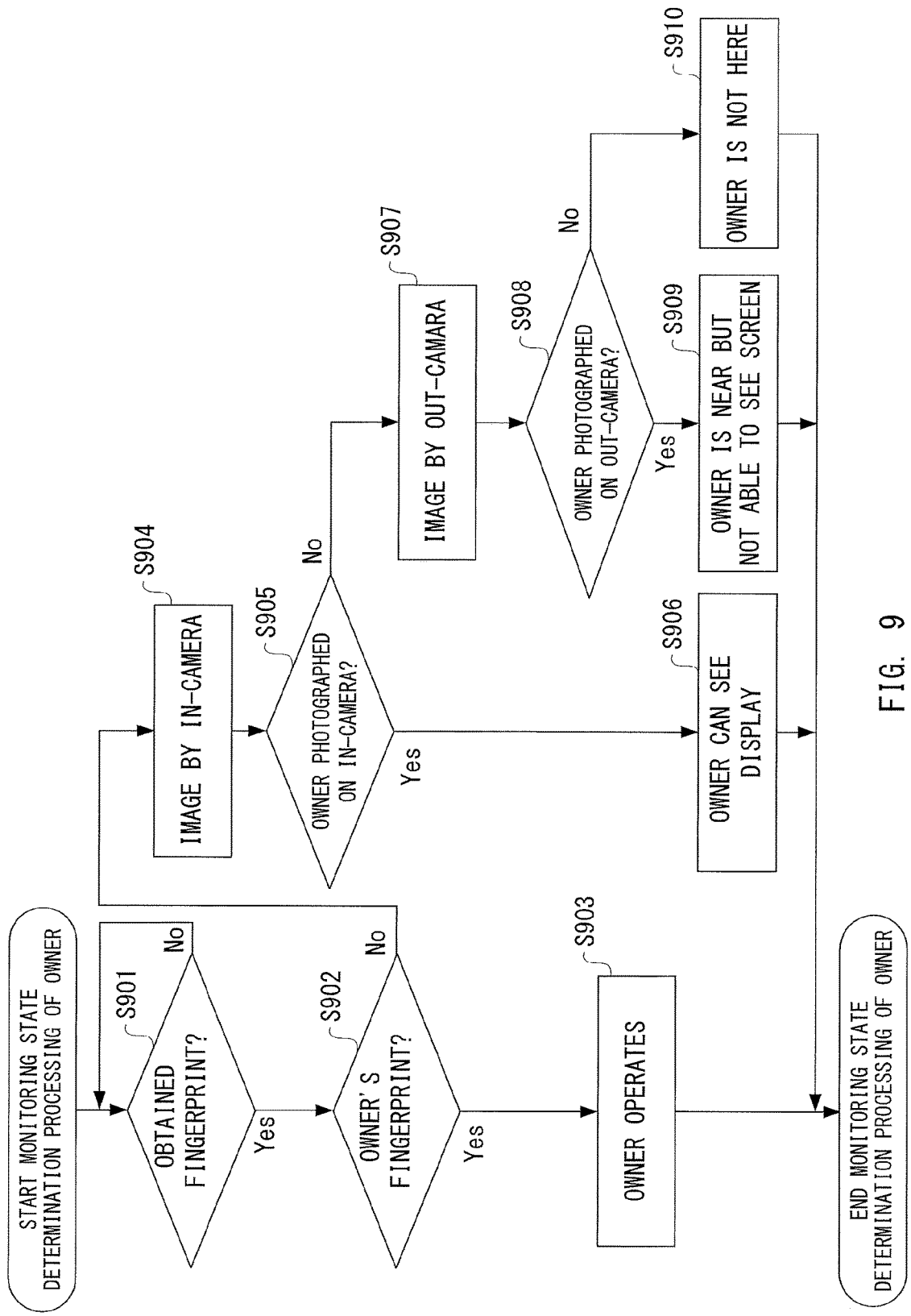
FIG. 9 is a flowchart illustrating a particular example of the monitoring state determination processing of the owner.

FIG. 9 is a flowchart illustrating a particular example of the monitoring state determination processing of the owner according to the present embodiment. The security control unit obtained finger204 obtains the fingerprint information via the fingerprint sensor 701 (S901). If the fingerprint information is obtained (S901: Yes), the security control unit 204 determines whether or not the obtained fingerprint information is the fingerprint information of the owner via the fingerprint sensor control unit 801 (S902). If the fingerprint information is not obtained (S901: No), the processing proceeds again to the processing of Step S901.

If it is determined that the obtained fingerprint information is the fingerprint information about the owner (S902: Yes), the security control unit 204 determines that the owner is operating the information processing apparatus 101 (S903). If it is determined that the obtained fingerprint information is not the fingerprint information about the owner (S902: No), the security control unit 204 executes imaging by the in-camera 103 (S904). The security control unit 204 analyzes whether a person matching with the face image information of the person 501 registered in the storage unit 207 is found or not in the imaged image. Based on the analysis result, the security control unit 204 determines whether the person 501 is found in the imaging image of the in-camera 103 (S905) or not. If it is determined that the person 501 is found in the imaging image of the in-camera 103 (S905: Yes), the security control unit 204 determines that the person 501 as the owner is in a situation where he can see the display screen (S906). If it is determined that the person 501 is not found in the imaging image of the in-camera 103 (S905: No), the security control unit 204 executes imaging by the out-camera 104 (S907). Note that each processing from the Steps S907 to S910 is the same as each processing from the Steps S406 to S409 shown in FIG. 4, therefore the description thereof will be omitted.

After determining the monitoring state of the owner, the security control unit 204 sets the operation restriction level of the information processing apparatus 101 according to the determination result. In the following, description will be given with regard to the operation restriction level which is set with FIG. 10.

FIG. 10 is a table illustrating an example of the operation restriction level of the information processing apparatus 101 which is set according to the monitoring state determination result of the owner according to the present embodiment. In the table shown in FIG. 10, each item, including in-camera image, out-camera image, detection result of fingerprint sensor, monitoring state of owner, and operation restriction, is defined, by respectively associating with situations.

For example, suppose it is determined in the processing of Step 902 that the owner is operating the information processing apparatus 101. In this case, the security control unit 204 does not restrict any operation of the information processing apparatus 101 in the processing of Step S302 shown in FIG. 3. That is, the security control unit 204 sets the operation restriction level to a mode where all functions and applications of the information processing apparatus 101 are made available. Further, suppose it is determined in the processing of Step S902 that the owner is not operating the information processing apparatus 101. In this case, the security control unit 204 determines the monitoring state of the owner based on the imaged images of the in-camera 103 or the out-camera 104 and sets the operation restriction level of the information processing apparatus 101 according to the determination result.

As mentioned, the information processing apparatus according to the present embodiment determines whether the owner is operating the information processing apparatus based on the fingerprint information obtained by the fingerprint sensor 701 or not. This enables to more accurately determine a person who is operating the information processing apparatus.

In a third embodiment, description is given with regard to a case where, when the in-camera used in the first and the second embodiments is not used, a state of how the owner is monitoring the apparatus is estimated and an operation restriction according to the state is set. Also, in the third embodiment, similar to the second embodiment, fingerprint information about a subject person is handled as biological information and the biological information is obtained using a fingerprint sensor included in the information processing apparatus. Note that same symbols are used for the functional components which are identical to those as already described in the first and the second embodiments and the description thereof will be omitted.

Figure 11:
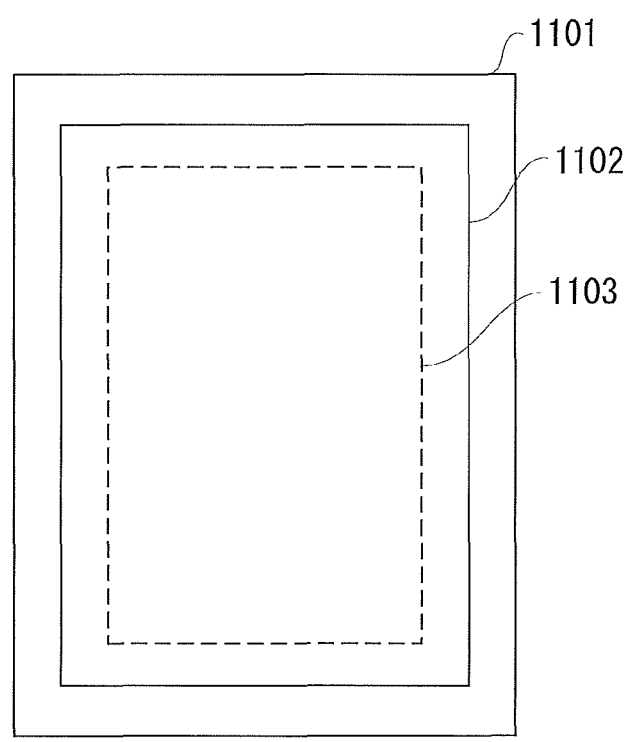
FIG. 11 is a diagram illustrating an example of the appearance of an image processing apparatus according to a third embodiment.

First, description is given with regard to temporary registration processing, in which, based on the biological information obtained using the fingerprint sensor, a state where the owner passed the apparatus to the person who is not the owner is identified, and the person who is not the owner is temporarily registered as a person who is temporarily given an operation permission. FIG. 11 is a schematic front view illustrating an example of the appearance of an image processing apparatus according to the present embodiment. The information processing apparatus 1101 shown in FIG. 11 includes a touch panel display 1102 and a fingerprint sensor 1103. The fingerprint sensor 1103 is provided on the back side of the touch panel display 1102.

The touch panel display 1102 includes a display screen on which various information is displayed. The touch panel display 1102 also includes a sensor to detect, for example, an input such as a touch input by an operator. In the following description, the touch panel display 102 is simply referred to as a touch panel 1102. As shown in FIG. 11, the fingerprint sensor 1103 is provided on the back side of the touch panel 1102. Further, the fingerprint sensor 1103 obtains fingerprint information of a finger touched the surface of the touch panel 1102. Also, the fingerprint sensor 1103 is configured to separately obtain a plurality of fingerprint information when a plurality of fingers touched the surface of the touch panel 1102. Here, the fingerprint sensor 1103 is illustrated in a size to be contained in the touch panel 1102. Not restricted to this, the size of the fingerprint sensor 1103 may be the same as that of the touch panel 1102. Further, depending on a position and a size of an area used to display as a screen, a position and a size of the fingerprint detection area of the fingerprint sensor 1103 on the touch panel 1102 may be set.

Figure 12:
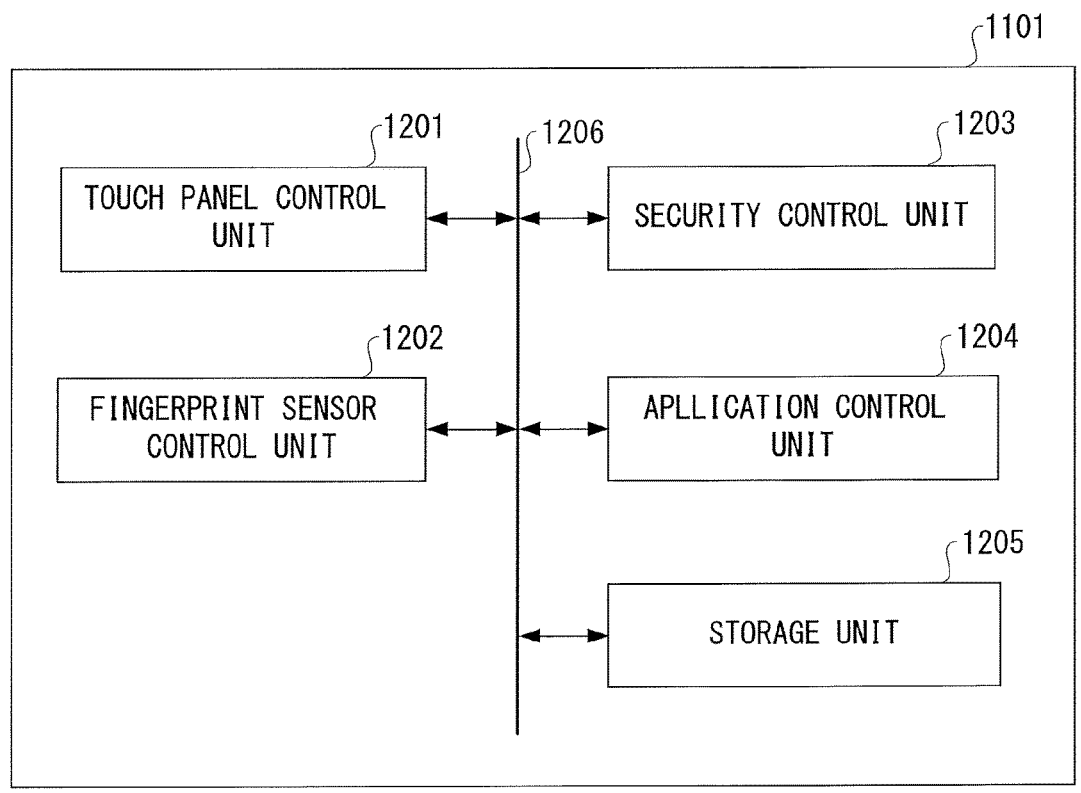
FIG. 12 is a block diagram illustrating an example of a functional configuration of the image processing apparatus.

FIG. 12 is a block diagram illustrating an example of functional configuration of the image processing apparatus 1101. The information processing apparatus 1101 includes a touch panel control unit 1201, a fingerprint sensor control unit 1202, a security control unit 1203, an application control unit 1204, and a storage unit 1205. Note that, also in the third embodiment, each functional unit is realized by the CPU included in the information processing apparatus 1101 as hardware. In particular, each function unit is realized by the CPU by reading a predetermined program stored in a program memory and the like and executing processing in accordance with each flow chart as will be described later. Further, when hardware is constituted as an alternative to at least a part of the software processing using the CPU as above, a computing unit or a circuit corresponding to processing of each functional unit described in this description may be constituted.

The touch panel control unit 1201 controls the touch panel 1102. In particular, the touch panel control unit 1201 obtains information input from the touch panel 1102 and transmits the operation information which indicates the operation performed by the operator of the application control unit 1204. Based on an instruction from the application control unit 1204, the touch panel control unit 1201 also displays various information on the display screen of the touch panel 1102. The touch panel 1102 as controlled in this manner works as an input unit for receiving input information from a subject operator. Also, interpreting the input information in light of what is displayed on the display screen, the touch panel control unit 1201 works as a receiving unit for accepting the operation of the operator.

The fingerprint sensor control unit 1202 controls the fingerprint sensor 1103. In particular, when a finger touched a fingerprint detection area of the fingerprint sensor 1103, the fingerprint sensor control unit 1202 controls to obtain fingerprint information of the finger. Also, the fingerprint sensor control unit 801 analyzes the obtained fingerprint. This is an analysis, for example, to extract the fingerprint information from the detection result of the fingerprint sensor 1103. Then, the extracted fingerprint information is compared with the fingerprint information which is registered in the storage unit 1205 or temporarily registered as a person who is temporarily given an operation permission. Then, it is determined whether a predetermined condition is satisfied or not. In this way, the fingerprint sensor control unit 1202 works as an analysis unit.

According to the analysis result of the fingerprint sensor control unit 1202, the security control unit 1203 sets permission/non-permission of a response to the operation to the information processing apparatus 101, that is, the security control unit 1203 sets a security level (operation restriction level). In the present embodiment, it is deemed that the temporarily registered person is a person who got approval from the owner so that while the apparatus is being operated by the temporarily registered person, the owner can monitor the information processing apparatus at a high level. Based on this, the type(s) of processing which is allowed for the operator is determined. The processing procedure of the control will be described in the following description in detail with FIG. 13.

The application control unit 1204 controls various applications executed in the information processing apparatus 1101, including start or end of Web browser, e-mail application, telephone application and the like.

The storage unit 1205 stores various programs executed by the CPU and various data. For example, the storage unit 1205 includes various storage devices such as a ROM (not shown), a RAM (not shown) and a hard disk drive (not shown). Further, fingerprint information about the owner of the information processing apparatus 1101 is registered in advance as the registered biological information. Description is given with regard to a processing procedure of the operation restriction by the information processing apparatus 1101 with FIGS. 13 to 14.

Figure 13:
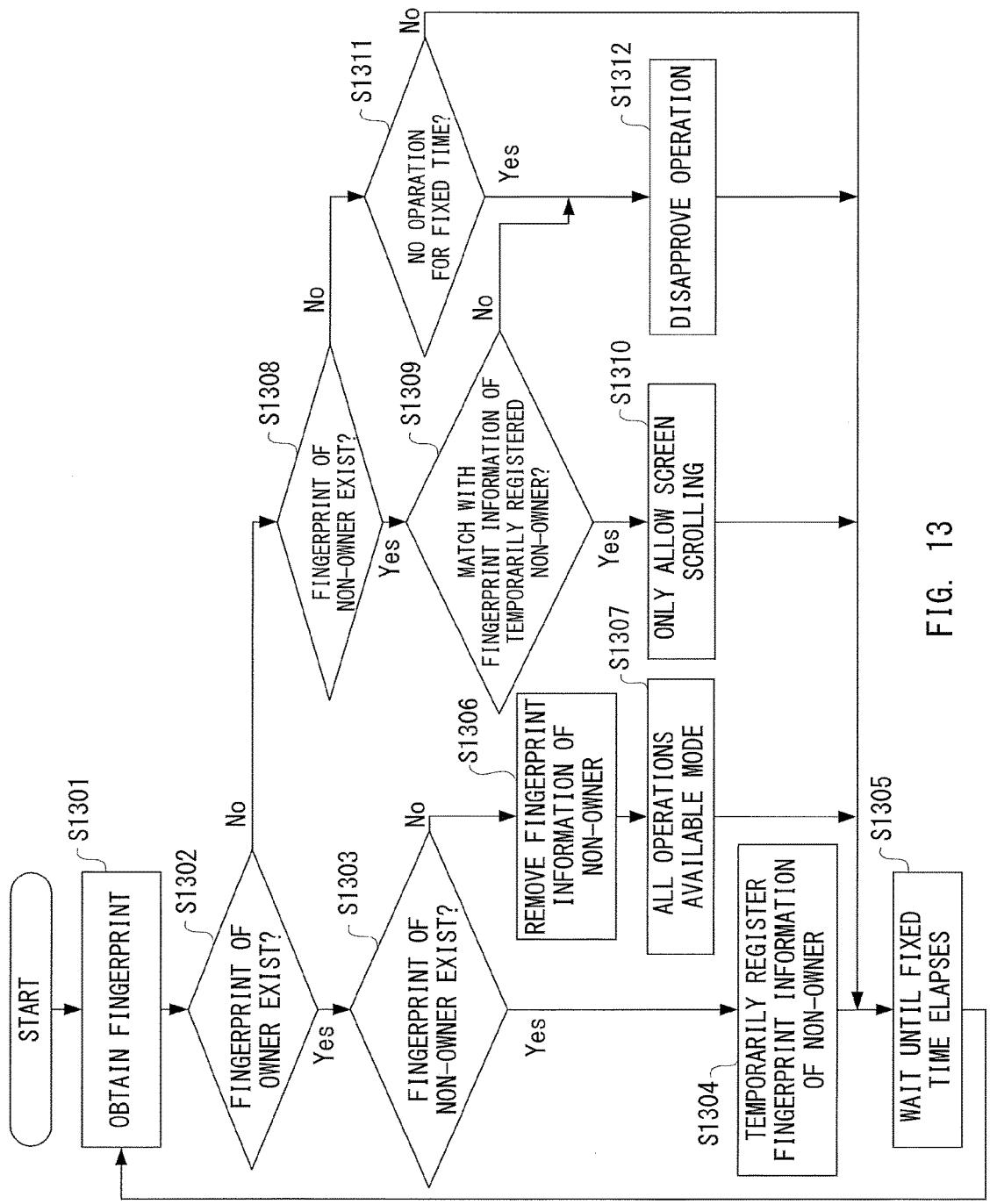
FIG. 13 is a flowchart illustrating an example of a processing procedure which sets the operation restriction level of the information processing apparatus.

FIG. 13 is a flowchart illustrating an example of a processing procedure which sets an operation restriction level of the information processing apparatus 1101. Note that each processing shown in FIG. 13 is mainly executed by the security control unit 1203.

Figure 14A:
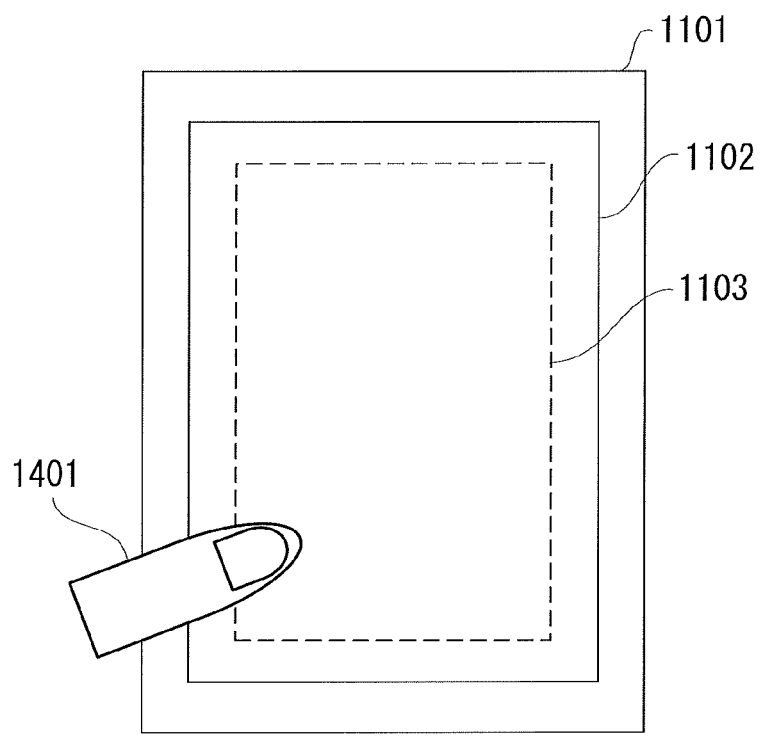
FIG. 14A is a diagram illustrating a situation where the owner is operating the information processing apparatus.
Figure 14B:
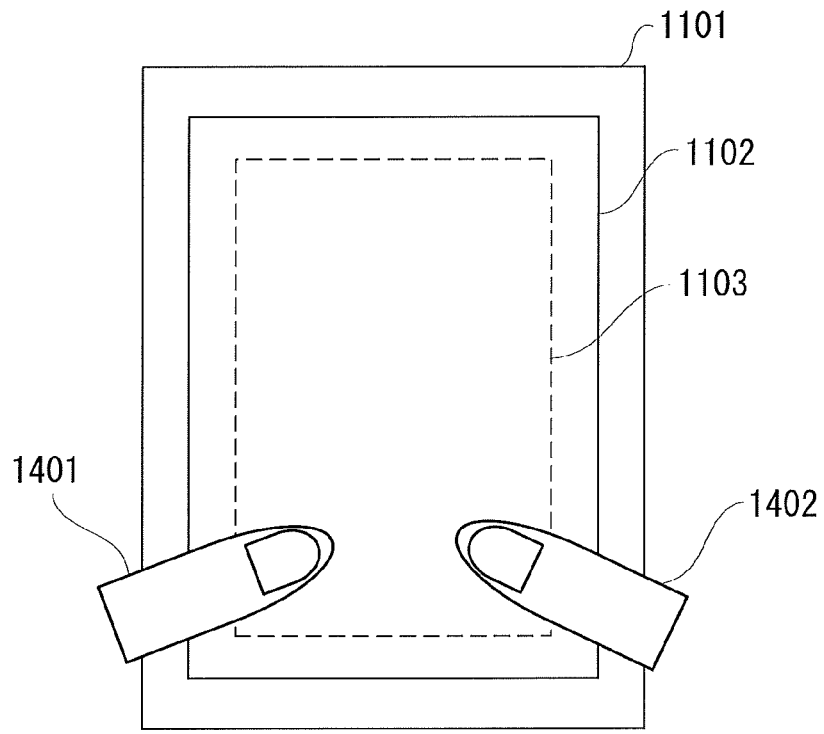
FIG. 14B is a diagram illustrating a situation where the owner is passing the information processing apparatus to a non-owner.
Figure 14C:
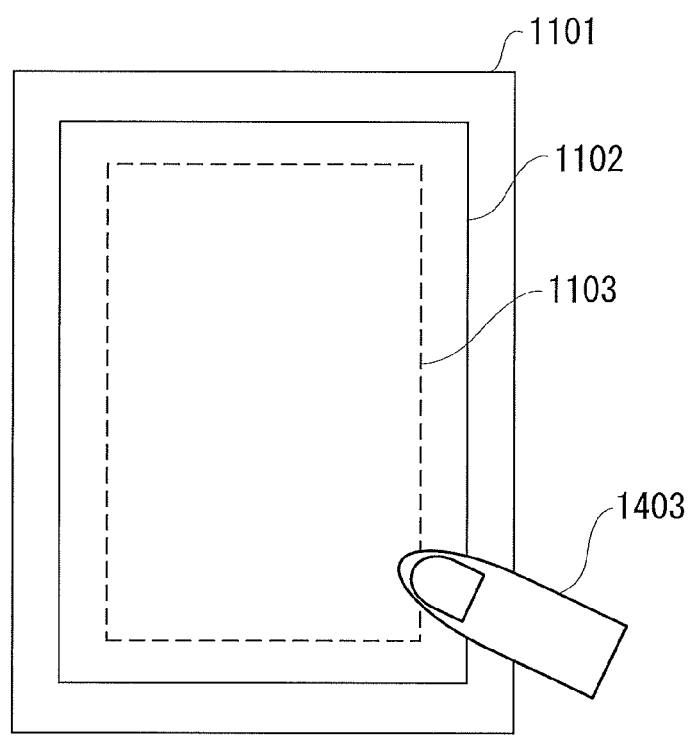
FIG. 14C is a diagram illustrating a situation where the non-owner is operating the information processing apparatus.

FIGS. 14A, 14B and 14C are image diagrams, each representing a situation where an operator operates the image processing apparatus 1101. As time passes, a situation changed from a situation shown in FIG. 14A to a situation shown in FIG. 14B, then, changed to a situation shown in FIG. 14C. Based on this, description is given as follows. FIG. 14A represents a situation where, for example, the owner is operating the information processing apparatus 1101 and a finger 1401 of the owner is touching the touch panel 1102. In this case, fingerprint information of the finger 1401 is obtained by the fingerprint sensor 1103.

FIG. 14B represents a situation where, for example, the owner is passing the image processing apparatus 1101 to a person other than the owner (hereinafter referred to as a non-owner), in which both the finger 1401 of the owner and a finger 1402 of the non-owner are touching the touch panel 1102. In this case, fingerprint information of the finger 1401 and the finger 1402 are respectively obtained by the fingerprint sensor 1103. FIG. 14C represents a situation, where, for example, the non-owner is operating the information processing apparatus 1101, in which a finger 1403 of the non-owner touching the touch panel 1102. In this case, fingerprint information of the finger 1403 is obtained by the fingerprint sensor 1103. Description is given, based on each of the situations as above, with regard to a processing procedure of the operation restriction by the information processing apparatus 1101.

The security control unit 1203 obtains fingerprint information (S1301). The security control unit 1203 determines whether the fingerprint information of the owner is included in the obtained fingerprint information via the fingerprint sensor control unit 1202 (S1302) or not. If it is determined that the fingerprint information about the owner exists in the obtained fingerprint information (S1302: Yes), the security control unit 1203 determines whether or not the fingerprint information of the non-owner is included in the obtained fingerprint information via the fingerprint sensor control unit 1202 (S1303). If it is determined that the fingerprint information of the owner does not exist in the obtained fingerprint information (S1302: No), the processing proceeds to a processing of Step S1308.

If it is determined that the fingerprint information of the non-owner exists in the obtained fingerprint information (S1303: Yes), the security control unit 1203 temporarily registers the fingerprint information of the non-owner in the storage unit 1205 (S1304). That is, in the situation shown in FIG. 14B, in a case where both the fingerprint information about the owner and the non-owner are obtained, the fingerprint information of the non-owner is temporarily registered. Thereafter, the security control unit 1203 waits until a fixed time elapses (S1305). Then, after a fixed time elapses, the security control unit 1203 returns to the processing of Step S1301. If it is determined that the fingerprint information of the non-owner does not exist in the obtained fingerprint information (S1303: No), the security control unit 1203 proceeds to a processing of Step S1306.

If it is determined in the processing of Step S1302 that the fingerprint information of the owner does not exist in the obtained fingerprint information, the security control unit 1203 determines whether the fingerprint information of the non-owner is included in the obtained fingerprint information or not (S1308). If it is determined that the fingerprint information of the non-owner exists in the obtained fingerprint information (S1308), the security control unit 1203 determines whether the fingerprint information is the fingerprint information of the temporarily registered non-owner (S1309) or not. If it is determined that the fingerprint information is the fingerprint information of the temporarily registered non-owner (S1309: Yes), the security control unit 1203 sets the operation restriction level of the information processing apparatus 1101 to a mode where only allows a screen scroll operation (S1310). That is, when a situation is turned to the situation shown in FIG. 14C after experiencing the situation shown in FIG. 14B, only the screen scroll operation is allowed to the non-owner.

As mentioned, when passing the information processing apparatus 1101 from the owner to the non-owner, the owner's finger and the non-owner's finger touch the touch panel 1102 at the same time. In such occasion, certain operation authority in the information processing apparatus 1101 can be given to the non-owner. Further, by restricting the operation authority given in this case to a part of functions, it is possible to prevent the non-owner from performing the owner's unintended operation. For example, it is possible to allow the scroll operation of the Web page currently displayed and not to allow the operation of other applications such as the telephone application, the e-mail application and the like.

Further, only when the fingerprint information about the owner and the fingerprint information of a person other than the owner are detected at the same time by the fingerprint sensor 1103, the fingerprint information other than the owner is temporarily registered. Thus, only by a simple operation of naturally passing the information processing apparatus 1101, for example, it is possible to temporarily give operation permission to the non-owner. That is, no complicated work such as explicitly registering the fingerprint information of a plurality of operators other than the owner in advance is required.

In the processing of Step S1309, in a case where the obtained fingerprint information of the non-owner does not match with the temporarily registered fingerprint information, the security control unit 1203 sets to a mode where disapproves all operations to the information processing apparatus 1101 (S1312). That is, the security control unit 1203 sets the operation restriction level to a mode where all functions and applications of the information processing apparatus 1101 are unavailable. Disapproving operation means, for example, to turn off (OFF) the display on the display screen of the touch panel 102 so that nothing is displayed on the display screen. Unlike the situation shown in FIG. 14B, this is the processing of a case where, for example, a person who did not touch the touch panel 1102 with the owner at the same time is about to operate the information processing apparatus 1101. This also includes a case where the temporarily registered fingerprint information did not exist. This enables to prevent an owner's unintended person from selfishly operating the information processing apparatus in secret.

In the processing of Step S1308, in a case where the fingerprint information of the non-owner does not exist in the obtained fingerprint information, the security control unit 1203 determines whether any operation is accepted until a fixed time elapses or not (S1311). That is, this is a situation where neither the owner nor the non-owner, that is, nobody is operating the information processing apparatus 1101. If it is determined that the information apparatus 1101 is not operated until a fixed time elapses (S1311: Yes), the security control unit 1203 sets a mode where all operations to the information processing apparatus 1101 is disapproved (such as lock state) (S1312). If it is determined that the information apparatus 1101 is operated until a fixed time elapses (S1311: No), the processing proceeds to the processing of Step S1305.

In the processing of Step S1303, in a case where the fingerprint information of the non-owner does not exist in the obtained fingerprint information, the security control unit 1203 removes the fingerprint information of the temporarily registered non-owner (S1306). It is estimated that this is a situation where an operation by a person other than the owner completed the operation, and the information processing apparatus 1101 is returned to the owner. That is, this is a situation where the owner is operating the information processing apparatus 1101 so that, thereafter, any operation by a person other than the owner will not be allowed. Note that, in the processing of Step 1306, in a case where the fingerprint information of the temporarily registered non-owner does not exist, nothing is particularly executed.

The security control unit 1203 sets the operation restriction level to a mode where all functions and applications included in the information processing apparatus 1101 are made available (S1307).

As mentioned, in the information processing apparatus according to the present embodiment, by a natural operation of passing the information processing apparatus from the owner to the non-owner, certain operation authority is given to the non-owner. Further, by restricting the operation authority given in this case to only a part of functions, it is possible to prevent the non-owner from performing the owner's unintended operation.

Figure 15:
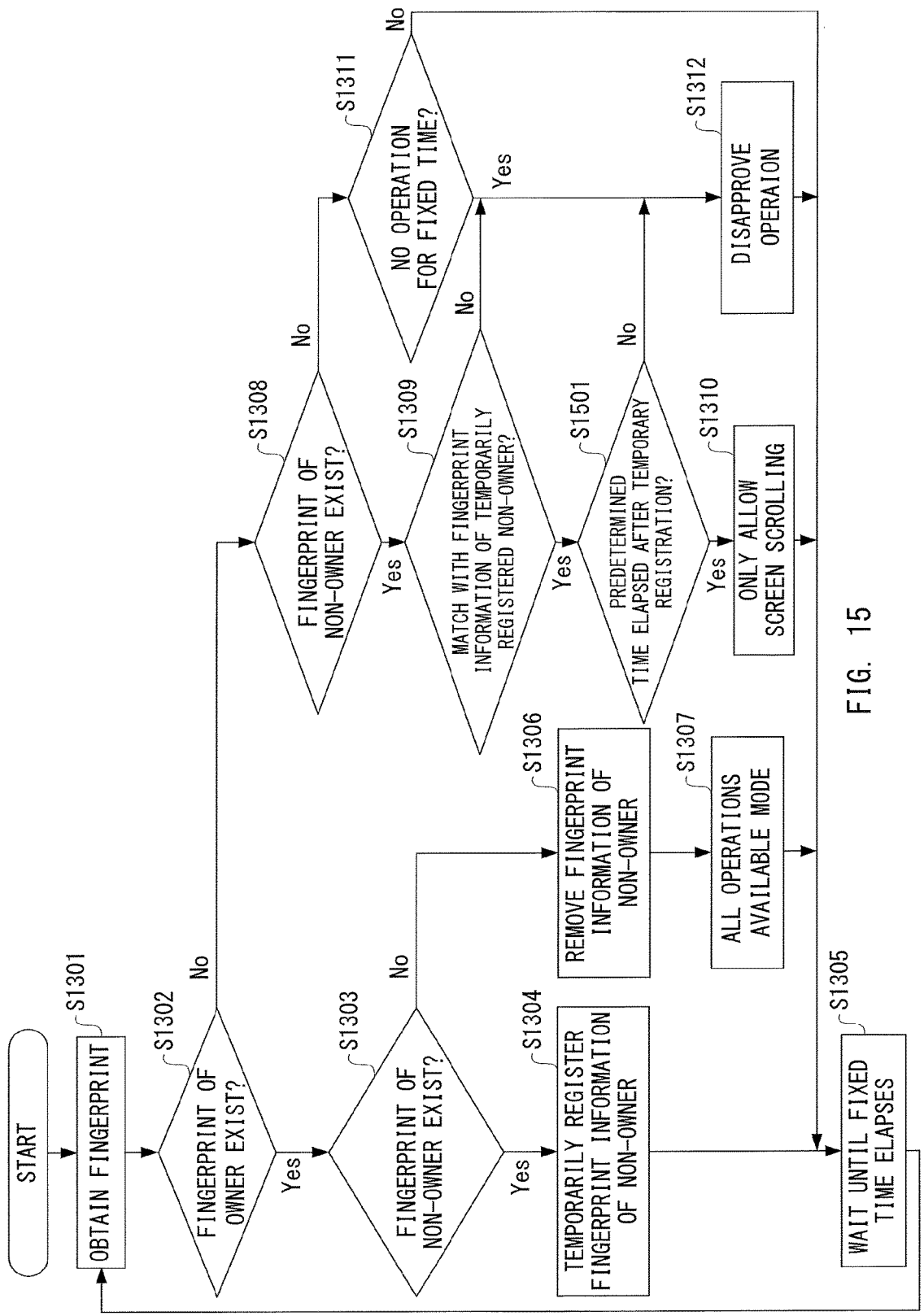
FIG. 15 is a flowchart illustrating an example of a processing procedure which sets the operation restriction level of the information processing apparatus.

Next, in addition to the temporary registration processing of the non-owner by the fingerprint sensor as described in the third embodiment, a variation is described, considering elapsed time after the temporary registration, positional relation between the owner and the apparatus is estimated, and the operation restriction according to the estimated positional relation is set. Also in the variation, the hardware and the functional configuration are the same as those of the third embodiment, therefore, the description thereof is omitted. Note that, as will be mentioned in the following description, based on the elapsed time after the temporal registration, a function to estimate the positional relation between the owner and the apparatus is added to the security control unit 1203 according to the variation. In the variation, in a situation where the apparatus is being operated by a temporary registrant, it is deemed very likely that the owner is near the apparatus and the temporary registrant until a predetermined time elapses from the temporary registration processing. Therefore, it is deemed that the owner can monitor the information processing apparatus at a high level and then, the type (s) of processing which is allowed for the operator is determined. On the other hand, after a predetermined time elapses from the temporary registration processing, it is deemed likely that the owner is away from the apparatus and the temporary registrant and it becomes difficult to monitor the apparatus. Therefore, even the temporary registrant, the operation is restricted. Description is given with regard to a processing procedure of the operation restriction by the information processing apparatus 1101 with FIGS. 15 to 16. FIG. 15 is a flowchart illustrating an example of a processing procedure which sets an operation restriction level of the information processing apparatus 1101. Note that each processing shown in FIG. 15 is mainly executed by the security control unit 1203. Note that, in the flowchart shown in FIG. 15, the same numbers are used for the processing common to that shown in FIG. 13 and the detailed description thereof is omitted. In the variation, if it is determined in the Step S1309 that the fingerprint information is the fingerprint information of the temporarily registered non-owner (S1309: Yes), the security control unit 1203 determines whether or not a predetermined time elapses after the temporary registration of the fingerprint information (S1501). If it is determined that a predetermined time elapses after the temporary registration of the fingerprint information (S1501: Yes), the security control unit 1203 sets the operation restriction level of the information processing apparatus 1101 to a mode where only allows a screen scroll operation (S1310). If it is determined that a predetermined time does not elapse after the temporal registration of the fingerprint information (S1501: No), the security control unit 1203 sets a mode where disapproves all operations to the information processing apparatus 1101 (S1312). Other processing is the same as that shown in FIG. 13, so that the detailed description thereof is omitted. Description will be given with regard to the operation restriction level which is set as a result of the flowchart processing shown in FIG. 15 with FIG. 16. FIG. 16 is a table illustrating an example of operation restriction level of the information processing apparatus 101 which is set according to the determination result of the monitoring state of the owner according to the variation of the third embodiment. In the table shown in FIG. 16, each item, including detection result of fingerprint sensor, elapsed time after temporal registration, monitoring the state of owner, and operation restriction is defined by respectively associating with a situation. For example, suppose it is determined in the processing of Step S1302 that the owner is operating the apparatus and suppose, in the processing of Step S1302, that no fingerprint of the non-owner is detected. In this case, it is determined that the owner is operating the apparatus so that the security control unit 1203 does not restrict any operation. The security control unit 1203 sets the operation restriction level to a mode where all functions and applications included in the information processing apparatus 1101 are made available. On the other hand, suppose in the processing of Step S1302 that no fingerprint of the owner is detected and it is determined in the processing of Step 1309 that the fingerprint of the temporary registered non-owner exists. In the variation of the third embodiment, the elapsed time after the temporary registration processing is determined in Step S1501. If the elapsed time after the temporary registration is less than a predetermined time, it is deemed very likely that the owner is near the information processing apparatus 1101 and operation restriction is executed where only allows a screen scroll operation. If the elapsed time after the temporary registration exceeds a predetermined time, it is deemed unlikely that the owner is near, and operation restriction is executed which inhibits operations of a user who is not the owner. As mentioned, by estimating a positional relation between the owner and the apparatus and reflecting the estimation result in the processing in which an authority is given to the non-owner using the fingerprint, it is possible to restrict, for example, a situation where the non-owner continues the operation for a long time against the owner's will. Note that, in the variation as mentioned, the operation restriction is distinguished by two stages, i.e., whether the elapsed time after the temporary registration exceeds a predetermined time or not. Not limited to this, a more gradual operation restriction may be set according to the length of the elapsed time. Even in that case, it is deemed very likely that as the elapsed time after the temporary registration gets longer, the distance from the owner to the apparatus becomes long. Thus, as the elapsed time after the temporary registration gets longer, processing which is allowed for the operation by the non-owner is more restricted.

[Variation]

Other example of determining which person is operating the information processing apparatus 101 according to a state of a face image in determining a control restriction level by the security control unit is described in the following description. When the operation restriction level is determined by the security control unit, it is possible to add face expression, such as how the owner's face looks when photographed, as an element of face image information. That is, if it is determined, as a result of analyzing the imaged owner's face, that the owner is closing his eyes, sleeping, or not facing to the touch panel, but looking in another direction, even the owner is photographed in the imaged image, the owner cannot monitor the operation. Therefore, the security control unit determines that the owner is not photographed in the imaged image, and determines the operation restriction level based on this. Also, in a case where the owner does not blink or there is no change in brightness of the face or face expression in the image, it is likely that the owner is not there but the owner's photograph is included in the image. Therefore, even in this case, deeming that the owner is not photographed in the imaged image, the operation restriction level may be determined.

Further, if it is determined as a result of analyzing the imaged owner's face, that the owner's face is angry or is about to cry, it is likely that the owner's unintended operation is performed. Therefore, even in this case, deeming that the owner is not photographed in the imaged image, the operation restriction level may be determined. It is noted that the change of the expression, such as whether the owner is blinking or not, can be analyzed through the continuous imaging.

Also, the operator of the information processing apparatus, whether it is the owner or the non-owner, may be determined differently from the determination processing based on the based on the size of the face in the image. For example, the determination processing may be performed based on an angle of a face included in the image, i.e., based on a direction to which the face included in the image is directed. In particular, the security control unit identifies a person whose face is mostly directed to the front among those included in the imaged images as the operator and if the operator is the owner, the security control unit determines that the owner is operating the apparatus. Also, if the identified operator is the non-owner, it may be determined that the non-owner is operating the apparatus. Also, the security control unit may identify a person whose face is the closest to the center among those included in the imaged image as the operator.

Also, the operation restriction level of the information processing apparatus is not limited to operations respectively corresponding to the four situations of "owner operates", "owner can see the display, "owner is near but is not able to see the display", and "owner is not here". For example, the allowable operations are severely restricted in the order of the four situations of "owner operates", "owner can see the display, "owner is near but is not able to see the display", and "owner is not here". That is, as the monitoring state of the owner gets lower, the security control unit controls to increase the security level. For example, if it is in a situation where "the owner can see the display", the execution of the e-mail application is only disapproved. Also, if it is in a situation where "though unable to see the display, the owner is near", the execution of the e-mail application and the telephone application is disapproved.

Further, imaging by the in-camera and the out-camera may be executed almost at the same time. Note that, in a case where the owner is not included within the imaged image of the in-camera, in terms of processing load and power consumption, it is preferable to control the apparatus such that the image is taken by the out-camera.

Also, it may be configured to perform the temporary registration in a case where both the fingerprint information of the owner and the non-owner are obtained within a predetermined time. Note that the fingerprint sensor may be capable of obtaining a plurality of fingerprint information. For example, a plurality of fingerprint sensors capable of obtaining one fingerprint may be provided. Further, in addition to providing the fingerprint sensor on the back side of the touch panel, the fingerprint sensor may be provided on other position such as on the back side of the information processing apparatus. For example, in a case where the fingerprint information of the non-owner is obtained within a predetermined short time after the fingerprint information of the owner is obtained, a temporary operation authority may be given to the non-owner.

Further, when the operator performed an explicit particular operation, the information processing apparatus may obtain the biological information. Further, in addition to the fingerprint information and the face image information, the biological information may adapt various biological information including voiceprint information, vein information and the like.

Further, the present disclosure may be a method including a procedure of each processing performed in the information processing apparatus as mentioned. Further, the present disclosure may be a computer program to cause a computer to perform a procedure of each processing performed in the information processing apparatus. The computer program can be distributed via various storage medium or network. The computer program can be executed when it is installed on a computer having a storage device such as a ROM to realize the information processing apparatus as mentioned.

The present invention has been described in detail by way of the above-mentioned embodiments, but the scope of the present invention is not limited to those embodiments.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-080732, filed Apr. 10, 2014 and 2015-035786, filed Feb. 25, 2015, which are hereby incorporated by references wherein in their entirety.

What is claimed is:

1. An information processing apparatus comprising at least one processor programmed to function as:
   an obtaining unit configured to obtain biological information of a person; and
   a determination unit configured to determine, based on a state of the biological information of a plurality of persons including a specific person, processing which is allowed for a person other than the specific person, the processing being performed by the information processing apparatus,
   wherein the determination unit is further configured to determine processing which is allowed for the person other than the specific person in relation to a plurality of positional relations between the specific person and the information processing apparatus,
   wherein the obtaining unit is further configured to obtain fingerprint information as the biological information, the fingerprint information detected by a fingerprint sensor provided on the information processing apparatus, and
   wherein the positional relation is estimated based on elapsed time from when it is estimated that the specific person passed the information processing apparatus to the person other than the specific person based on the fingerprint information obtained by the obtaining unit.

2. The information processing apparatus according to claim 1, wherein the determination unit is further configured to estimate that the specific person is within a range close to the information processing apparatus in a case where the elapsed time is shorter than a predetermined time, and to estimate that the specific person is not within a range close to the information processing apparatus in a case where the elapsed time exceeds a predetermined time.

3. The information processing apparatus according to claim 1, wherein the determination unit is further configured to prevent the information processing apparatus from responding to the person other than the specific person in a case where the elapsed time exceeds a predetermined time.

4. The information processing apparatus according to claim 1, wherein the determination unit is further configured to:
   gradually increase or decrease the types of processing which is performed by the information processing apparatus and allowed for the person other than the specific person according to a length of the elapsed time; and
   decrease the types of the processing which is allowed for the person other than the specific person as the elapsed time is increased.

5. An information processing apparatus comprising at least one processor programmed to function as:

an obtaining unit configured to obtain biological information of a person; and a determination unit configured to determine, based on a state of the biological information of a plurality of persons including a specific person, processing which is allowed for a person other than the specific person, the processing being performed by the information processing apparatus, wherein the determination unit is further configured to determine processing which is allowed for the person other than the specific person in relation to a plurality of positional relations between the specific person and the information processing apparatus, and wherein the determination unit is further configured to:
(1) allow only the operation for an application being executed for the person other than the specific person, in a case where it is estimated that a positional relation between the specified person and the information processing apparatus is in a first relation;
(2) allow only a scroll operation of a display being displayed for the person other than the specific person in a case where the positional relation is in a second relation which is different from the first relation; and
(3) inhibit any response for the person other than the specified person in a case where the positional relation is in a third relation which is different from the first relation and the second relation.

6. The information processing apparatus according to claim 5, wherein the obtaining unit is further configured to obtain the biological information based on a face image of a person detected from images imaged by a first camera and a second camera, the first camera for photographing a person who is looking a display provided on the information processing apparatus and the second camera provided in a direction opposite to that of the first camera;
the first relation represents the positional relation in which both the specific person and the person other than the specific person are photographed on the first camera;
the second relation represents the positional relation in which the person other than the specific person is photographed on the first camera and the specific person is photographed on the second camera; and
the third relation represents a relation in which the specific person is photographed on neither the first camera nor the second camera.

7. An information processing apparatus comprising at least one processor programmed to function as:
an obtaining unit configured to obtain biological information of a person; and
a determination unit configured to determine, based on a state of the biological information of a plurality of persons including a specific person, processing which is allowed for a person other than the specific person, the processing being performed by the information processing apparatus,
wherein the determination unit is further configured to determine processing which is allowed for the person other than the specific person in relation to a plurality of positional relations between the specific person and the information processing apparatus, and
wherein the obtaining unit is further configured to obtain the biological information based on a face image of a person detected from images imaged by a first camera and a second camera, the first camera for photographing a person who is looking a display provided on the information processing apparatus and the second camera provided in a direction opposite to that of the first camera;
the determination unit is further configured to differentiate processing which is executable to the person other than the specific person according to positional relation between the specific person and the information processing apparatus, whether it is in a first relation, in a second relation, or in a third relation;
the first relation represents the positional relation in which both the specific person and the person other than the specific person are photographed on the first camera;
the second relation represents the positional relation in which the person other than the specific person is photographed on the first camera and the specific person is photographed on the second camera; and
the third relation represents a relation in which the specific person is photographed on neither the first camera nor the second camera.

8. A method for controlling an information processing apparatus comprising:
determining, based on a state of obtained biological information of a plurality of persons including a specific person, processing which is allowed for the person other than the specific person; and
determining processing which is allowed for the person other than the specific person in relation to a plurality of positional relations between the specific person and the information processing apparatus,
wherein the determination unit is further configured to:
(1) allow only the operation for an application being executed for the person other than the specific person, in a case where it is estimated that a positional relation between the specified person and the information processing apparatus is in a first relation;
(2) allow only a scroll operation of a display being displayed for the person other than the specific person in a case where the positional relation is in a second relation which is different from the first relation; and
(3) inhibit any response for the person other than the specified person in a case where the positional relation is in a third relation which is different from the first relation and the second relation.

9. A method for controlling an information processing apparatus comprising:
determining, based on a state of obtained biological information of a plurality of persons including a specific person, processing which is allowed for the person other than the specific person; and
determining processing which is allowed for the person other than the specific person in relation to a plurality of positional relations between the specific person and the information processing apparatus,
wherein the obtaining unit is further configured to obtain the biological information based on a face image of a person detected from images imaged by a first camera and a second camera, the first camera for photographing a person who is looking a display provided on the information processing apparatus and the second camera provided in a direction opposite to that of the first camera;
the determination unit is further configured to differentiate processing which is executable to the person other than the specific person according to positional relation between the specific person and the information processing apparatus, whether it is in a first relation, in a second relation, or in a third relation;

the first relation represents the positional relation in which both the specific person and the person other than the specific person are photographed on the first camera;

the second relation represents the positional relation in which the person other than the specific person is photographed on the first camera and the specific person is photographed on the second camera; and the third relation represents a relation in which the specific person is photographed on neither the first camera nor the second camera.

10. A computer readable non-transient storage medium having stored thereon a program for causing a computer to:

determine, based on a state of obtained biological information of a plurality of persons including a specific person, processing which is allowed for the person other than the specific person; and determine processing which is allowed for the person other than the specific person in relation to a plurality of positional relations between the specific person and the computer, wherein the determination unit is further configured to:
(1) allow only the operation for an application being executed for the person other than the specific person, in a case where it is estimated that a positional relation between the specified person and the computer is in a first relation;
(2) allow only a scroll operation of a display being displayed for the person other than the specific person in a case where the positional relation is in a second relation which is different from the first relation; and
(3) inhibit any response for the person other than the specified person in a case where the positional relation is in a third relation which is different from the first relation and the second relation.

11. A computer readable non-transient storage medium having stored thereon a program for causing a computer to:

determine, based on a state of obtained biological information of a plurality of persons including a specific person, processing which is allowed for the person other than the specific person; and determine processing which is allowed for the person other than the specific person in relation to a plurality of positional relation between the specific person and the computer, wherein the obtaining unit is further configured to obtain the biological information based on a face image of a person detected from images imaged by a first camera and a second camera, the first camera for photographing a person who is looking a display provided on the computer and the second camera provided in a direction opposite to that of the first camera;

the determination unit is further configured to differentiate processing which is executable to the person other than the specific person according to positional relation between the specific person and the computer, whether it is in a first relation, in a second relation, or in a third relation;

the first relation represents the positional relation in which both the specific person and the person other than the specific person are photographed on the first camera;

the second relation represents the positional relation in which the person other than the specific person is photographed on the first camera and the specific person is photographed on the second camera; and the third relation represents a relation in which the specific person is photographed on neither the first camera nor the second camera.

\* \* \* \* \*